United States Patent [19]
Nakamura et al.

[11] Patent Number: 5,289,286
[45] Date of Patent: Feb. 22, 1994

[54] SOLID STATE SENSOR HAVING LOGARITHMIC PHOTOVOLTAIC RESPONSE, WITH PIXEL UNIFORMITY CORRECTION AND WHITE BALANCE CIRCUITRY THEREFOR

[75] Inventors: Satoshi Nakamura; Kenji Takada; Yasushi Kusaka, all of Osaka, Japan

[73] Assignee: Minolta Camera Kabushiki Kaisha, Japan

[21] Appl. No.: 914,708

[22] Filed: Jul. 15, 1992

[30] Foreign Application Priority Data

Jul. 18, 1991 [JP] Japan .................. 3-178170
Sep. 9, 1991 [JP] Japan .................. 3-258325
Dec. 10, 1991 [JP] Japan .................. 3-350928
Dec. 11, 1991 [JP] Japan .................. 3-351606

[51] Int. Cl.$^5$ ............................. H04N 5/335
[52] U.S. Cl. ........................ 348/223; 257/292; 257/431; 348/230; 348/251
[58] Field of Search ............ 358/213.11, 213.15, 358/213.17, 213.23, 164, 461, 41, 43, 44, 290, 163, 32; 257/431, 438, 449, 461, 291, 292; H04N 5/202, 5/335

[56] References Cited

U.S. PATENT DOCUMENTS

| | | | |
|---|---|---|---|
| 4,271,420 | 6/1981 | Chikamura et al. | 257/292 X |
| 4,407,010 | 9/1983 | Baji et al. | 257/292 |
| 4,447,746 | 5/1984 | Fang et al. | 257/292 X |
| 4,554,583 | 11/1985 | Saitoh | 358/163 |
| 4,602,291 | 7/1986 | Temes | 358/221 |
| 4,885,467 | 12/1989 | Horikawa | 358/163 X |
| 4,910,694 | 3/1990 | Walther | 358/213.17 |
| 4,943,710 | 6/1990 | Sakama et al. | 257/431 X |
| 5,047,861 | 9/1991 | Houchin et al. | 358/213.15 |
| 5,181,118 | 1/1993 | Kimura | 358/461 X |
| 5,194,943 | 3/1993 | Tomita et al. | 358/32 |
| 5,196,294 | 3/1993 | Lumelsky et al. | 358/164 X |

Primary Examiner—Mark R. Powell
Attorney, Agent, or Firm—Price, Gess & Ubell

[57] ABSTRACT

A solid-state image sensing apparatus includes a solid state image sensing device having a characteristic that an output voltage thereof natural-logarithmically varies in accordance with light reception amount. An image sensing output signal is obtained with respect to each pixel when uniform light is irradiated to the solid-state image sensing device. The difference is then calculated between an image sensing output signal obtained with respect to each pixel in actual sensing and an image sensing output signal with respect to a pixel corresponding thereto which signal is stored, to form an image signal.

5 Claims, 17 Drawing Sheets

SOLID STATE SENSOR HAVING LOGARITHMIC PHOTOVOLTAIC RESPONSE, WITH PIXEL UNIFORMITY CORRECTION AND WHITE BALANCE CIRCUITRY THEREFOR

BACKGROUND OF THE INVENTION

1. Field of the Invention

The present invention relates to a solid-state image sensing apparatus, and more particularly, to a solid-state image sensing apparatus provided with a solid-state image sensing device having a characteristic that an output voltage thereof natural-logarithmically varies in accordance with a light reception amount.

2. Description of the Prior Art

A conventionally-used solid-state image sensing device has a characteristic that an output voltage thereof linearly varies as a light reception amount varies. In the solid-state image sensing device having such a characteristic, each pixel has a different sensitivity. Due to this difference in sensitivity, an output value of each pixel is different from one another even if uniform light is irradiated.

FIG. 1 graphically shows a relationship between a light reception amount L and an output voltage VO of the above-mentioned conventional solid-state image sensing device. The relationship is expressed as:

$$VO \propto L$$

When there is a difference among a sensitivity $a_i$ of each pixel, an output voltage $V_i$ thereof is expressed as:

$$V_i \propto a_i \times L_i$$

where $L_i$ is a light reception amount of each pixel and $i=1, 2, 3, \ldots$ when uniform light L is irradiated onto the solid-state image sensing device, that is, $L=L_1=L_2=L_3=\ldots$, the output voltage $V_i$ of each pixel is also expressed as:

$$V_i \propto a_i \times L$$

Thereby, it is understood that there is a difference among an output voltage of each pixel. In order that the difference among an output voltage of each pixel is zero, the output voltages $V_i$ of all the pixels have to be equal to one another when the uniform light L is irradiated. If the sensitivities $a_i$ of all the pixels are equal, the output voltages $V_i$ of all the pixels are equal. It is virtually impossible, however, to equalize the sensitivities $a_i$ of all the pixels.

In the conventional solid-state image sensing apparatus, to solve the problem, the difference among an output of each pixel is corrected by the subsequently-described calculation. That is, the difference is corrected by multiplying the output voltage $V_i$ of a corresponding pixel by an inverse number of the sensitivity $a_i$ of each pixel. An output voltage $V_i'$ obtained through the correction is expressed as:

$$V_i' \propto (1/a_i)V_i$$
$$\propto (1/a_i) \times (a_i \times L_i)$$
$$\propto L_i$$

By the above calculation, the relationship between a light reception amount and an output voltage which relationship differs depending on each pixel can be caused to coincide with a reference line as shown in FIG. 2. Consequently, there is no problem in regarding that each pixel has an equal light reception amount/output voltage characteristic.

However, concerning a solid-state image sensing apparatus provided with a solid-state image sensing device having a characteristic that an output voltage thereof natural-logarithmically varies as a light reception amount varies, since it has a photoelectric conversion characteristic different from that of the above-described conventional solid-state image sensing device, it is impossible to correct the inequality in sensitivity of each pixel by the above-described method.

In a conventional solid-state color image sensing apparatus, since a photoelectric conversion characteristic thereof is linear, subtraction and multiplication/division are required in order to obtain white balance. That is, in the conventional solid-state color image sensing apparatus (where R (red), G (green) and B (blue) filters are provided), the following expressions hold:

$$V_{Ri}(L) = \int a_{Ri}L_R dt + d_{Ri} = a_{Ri}\int\{\int a_{Ri}(\lambda)L(\lambda)d\lambda\}dt + d_{Ri} \quad (1)$$

$$V_{Gj}(L) = \int a_{Gj}L_G dt + d_{Gj} = a_{Gj}\int\{\int a_{Gj}(\lambda)L(\lambda)d\lambda\}dt + d_{Gj} \quad (2)$$

$$V_{Bk}(L) = \int a_{Bk}L_B dt + d_{Bk} = a_{Bk}\int\{\int a_{Bk}(\lambda)L(\lambda)d\lambda\}dt + d_{Bk} \quad (3)$$

where:

$V_{Ri}(L)$ is an output of an ith pixel of an R channel at an illuminance L;

$V_{Gj}(L)$ is an output of a jth pixel of a G channel at an illuminance L;

$V_{Bk}(L)$ is an output of a kth pixel of a B channel at an illuminance L;

$a_{Ri}$ is a gain of an ith pixel of the R channel;

$a_{Gj}$ is a gain of a jth pixel of the G channel;

$a_{Bk}$ is a gain of a kth pixel of the B channel;

$d_{Ri}$ is a dark output of an ith pixel of the R channel;

$d_{Gj}$ is a dark output of a jth pixel of the G channel;

$d_{Bk}$ is a dark output of a kth pixel of the B channel;

$L_R$ is an illuminance of an R component of light;

$L_G$ is an illuminance of a G component of light;

$L_B$ is an illuminance of a B component of light;

$\alpha_{Ri}(\lambda)$ is a spectral transmission factor of an ith pixel of the R channel;

$\alpha_{Gj}(\lambda)$ is a spectral transmission factor of a jth pixel of the G channel;

$\alpha_{Bk}(\lambda)$ is a spectral transmission factor of a kth pixel of the B channel; and $L(\lambda)$ is a spectral characteristic of a subject light.

At this time, a gain $a$, a dark output $d$ and a spectral transmission factor $\alpha$ take different values depending on each pixel. In the conventional solid-state color image sensing apparatus, first, a dark output is subtracted from an output of each pixel in order to correct a difference among the dark output of each pixel. When a result of the subtraction is $V'$, $$V'_{R}(L) = a_{Ri}\int L_R dt = a_{Ri}\int\{\int a_{Ri}(\lambda)L(\lambda)d\lambda\}dt \quad (4)$$

$$V'_{G}(L) = a_{Gj}\int L_G dt = a_{Gj}\int\{\int a_{Gj}(\lambda)L(\lambda)d\lambda\}dt \quad (5)$$

$$V'_{B}(L) = a_{Bk}\int L_B dt = a_{Bk}\int\{\int a_{Bk}(\lambda)L(\lambda)d\lambda\}dt \quad (6)$$

Thereby, the difference among the dark output of each pixel is corrected. However, since a difference among the gain a of each pixel and a difference among the spectral transmission factor α of each pixel still remain, an output V' (W) obtained when a white light W is incident differs.

That is, $$V'_{R(}W) \neq V'_{G(}W) \neq V'_{Bk}(W).$$

To correct this, the following calculation is performed:

$$V_{R(}W) = a_{Ri} \int L_{WR} \times dt = a_{Ri} \int \{\int a_{R(}\lambda)L_w(\lambda)d\lambda\}dt \quad (7)$$

$$V_{G(}W) = a_{Gj} \int L_{WG} \times dt = a_{Gj} \int \{\int a_{G(}\lambda)L_w(\lambda)d\lambda\}dt \quad (8)$$

$$V_{Bk}(W) = a_{Bk} \int L_{WB} \times dt = a_{Bk} \int \{\int a_{Bk}(\lambda)L_w(\lambda)d\lambda\}dt \quad (9)$$

where $L_w$ is an illuminance of each color component of the white light W.

In order to correct so that all the outputs obtained at that time equal VO, each output V' (W) is multiplied by β with respect to which the following expressions hold:

$$\begin{aligned} V0 = \beta_i V_{R(}W) &= \beta_i \times a_{Ri} \int L_{wR} \times dt \quad (10) \\ &= \beta_i \times a_{Ri} \int \{\int a_{R(}\lambda)L_w(\lambda)d\lambda\}dt \end{aligned}$$

$$\begin{aligned} V0 = \beta_j V_{G(}W) &= \beta_j \times a_{Gj} \int L_{wG} \times dt \quad (11) \\ &= \beta_j \times a_{Gj} \int \{\int a_{G(}\lambda)L_w(\lambda)d\lambda\}dt \end{aligned}$$

$$\begin{aligned} V0 = \beta_k V_{Bk}(W) &= \beta_k \times a_{Bk} \int L_{wB} \times dt \quad (12) \\ &= \beta_k \times a_{Bk} \int \{\int a_{Bk}(\lambda)L_w(\lambda)d\lambda\}dt \end{aligned}$$

Therefore, all the outputs obtained when white light is irradiated are equalized by $$\begin{aligned} V'_{R(}L) &= \{V0/\int a_{R(}\lambda)L_w(\lambda)d\lambda\} \times \int a_{R(}\lambda)L(\lambda)d\lambda \quad (13) \\ &= \{V0/V_{R(}W)\} \times V_{R(}L) \end{aligned}$$

$$\begin{aligned} V'_{G(}L) &= \{V0/\int a_{G(}\lambda)L_w(\lambda)d\lambda\} \times \int a_{G(}\lambda)L(\lambda)d\lambda \quad (14) \\ &= \{V0/V_{G(}W)\} \times V_{G(}L) \end{aligned}$$

$$\begin{aligned} V'_{Bk}(L) &= \{V0/\int a_{Bk}(\lambda)L_w(\lambda)d\lambda\} \times \int a_{Bk}(\lambda)L(\lambda)d\lambda \quad (15) \\ &= \{V0/V_{Bk}(W)\} \times V_{Bk}(L) \end{aligned}$$

This is because $$V'_{R(}W) = \{V0/V_{R(}W)\} \times V'_{R(}W) = V0$$

$$V'_{G(}W) = \{V0/V_{G(}W)\} \times V'_{G(}W) = V0$$

$$V'_{Bk}(W) = \{V0/V_{Bk}(W)\} \times V'_{Bk}(W) = V0.$$

As described above, white balance is obtained by performing multiplication and division after a dark output is subtracted.

However, the above-described method where white balance is obtained by multiplication and division is disadvantageous in that a complicated arrangement is required for the circuit and that the processing takes time in a case where the multiplication and division are performed in a software manner. Further, when a color temperature of a light source changes, according to the conventional method, it is necessary to obtain white balance again by performing the multiplication and division again, since the previously-mentioned LW(λ) changes. That is, it is necessary to perform the multiplication and division every time the color temperature changes. As a result, a more complicated arrangement is required for the circuit in a case where correction is made with respect to the circuit, and more time is required because of the complicated calculation in a case where correction is made with respect to the software.

SUMMARY OF THE INVENTION

An object of the present invention is to provide a solid-state image sensing apparatus provided with a solid-state image sensing device having a characteristic that an output voltage thereof natural-logarithmically varies as a light reception amount varies and capable of correcting an inequality in sensitivity of each pixel.

Another object of the present invention is to provide a solid-state image sensing apparatus which includes a solid-state image sensing device having a characteristic that an output voltage thereof natural-logarithmically varies in accordance with a light reception amount, where a difference of a peripheral circuit such as an inequality in logarithmic characteristic of a transistor and an inequality in capacitance of a capacitor for integrating photo-charges is corrected as well as a difference in sensitivity between each pixel is corrected.

Further object of the present invention is to provide a solid-state image sensing apparatus for sensing color image which includes a solid-state image sensing device having a characteristic that an output voltage thereof natural-logarithmically varies in accordance with a light reception amount, where white balance is easily obtained.

BRIEF DESCRIPTION OF THE DRAWINGS

These and other objects and features of this invention will become clear from the following description taken in conjunction with the preferred embodiments with reference to the accompanied drawings in which.

DESCRIPTION OF THE PREFERRED EMBODIMENTS

Figure 1:
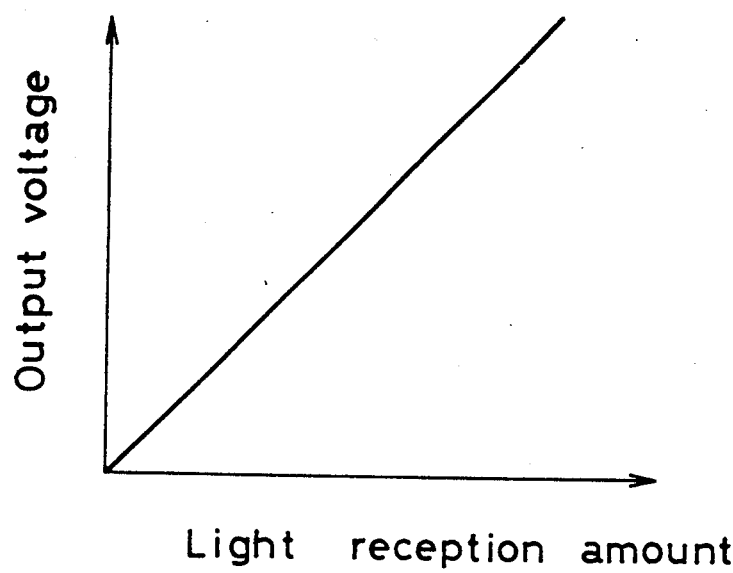
FIG. 1 graphically shows a light reception amount and output voltage characteristics of a solid-state image sensing device having a characteristics that an output voltage thereof linearly varies as a light reception amount varies.
Figure 2:
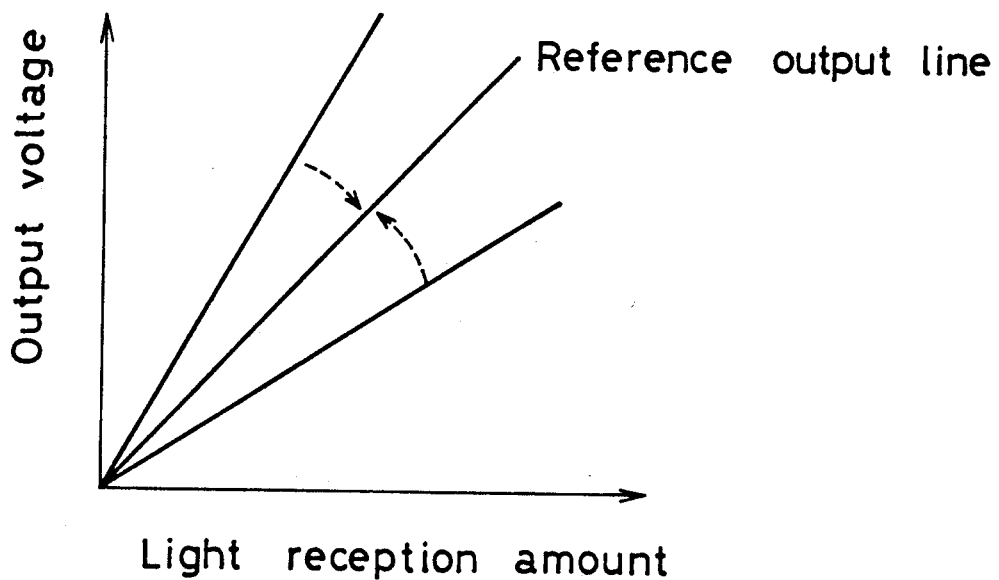
FIG. 2 graphically shows the difference, according to each pixel, in the light reception amount and output characteristics of the solid-state image sensing apparatus.
Figure 3:
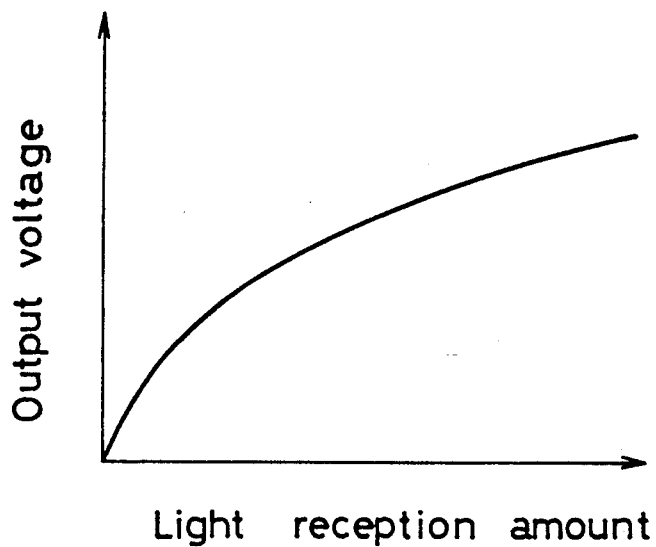
FIG. 3 graphically shows a light reception amount and output voltage characteristics of a solid-state image sensing device having a characteristic that an output voltage thereof natural-logarithmically varies as a light reception amount varies.

FIG. 3 graphically shows a relationship between a light reception amount L and an output voltage VO of a solid-state image sensing device having a characteristic that an output voltage thereof natural-logarithmically varies as a light reception amount varies. The relationship is expressed by the following expression:

$$V0 \propto \ln L$$

When a sensitivity $a_i$ of each pixel is unequal, $$V_i \propto \ln(a_i \times L_i)$$
$$\propto \ln a_i + \ln L_i$$

where $L_i$ is a light reception amount of each pixel.

Since each pixel has a different sensitivity $a_i$, the output voltage of each pixel differs even when uniform light L is irradiated, that is, even when $L = L1 = L2 = L3 = \ldots$. The output voltage difference can be corrected by removing the term including the sensitivity $a_i$. The calculation is enabled by subtracting $\ln a_i$ from $V_i$. An output voltage $V_i'$ obtained after the correction is expressed by the following expressions:

$$V_i' \propto V_i - \ln a_i$$
$$\propto (\ln a_i + \ln L_i) - \ln a_i$$
$$\propto \ln L_i$$

Figure 4:
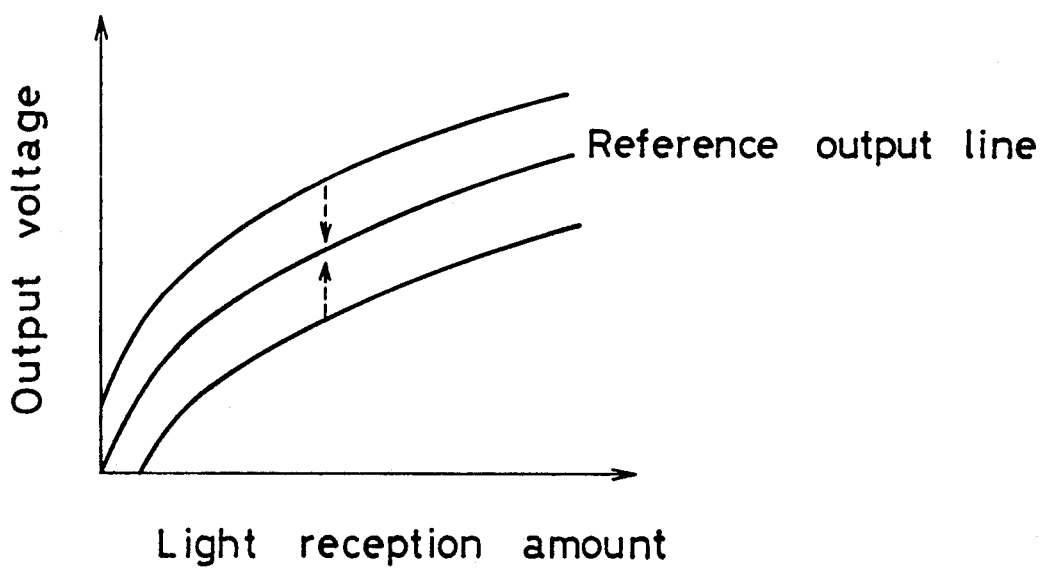
FIG. 4 graphically shows the difference, according to each pixel, in the light reception amount and output characteristics of a solid-state image sensing device having a characteristics that an output voltage thereof natural-logarithmically varies as a light reception amount varies.

As shown in FIG. 4, the relationship between a light reception amount and an output voltage of each pixel is conformed to a reference line by the above correction calculation. Thus, it is possible to regard each pixel as having an equal light reception amount and output voltage characteristic.

Figure 5:
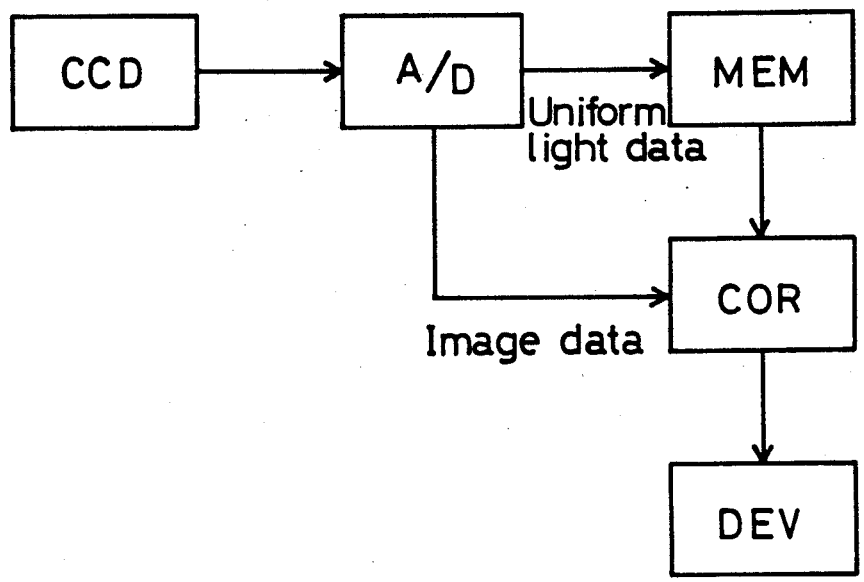
FIG. 5 is a block diagram of a first embodiment of the present invention.

FIG. 5 is a block diagram of a first embodiment of a solid-state image sensing apparatus constructed in accordance with the present invention. CCD represents a solid-state image sensing device having a characteristic that an output voltage thereof natural-logarithmically varies as a light reception amount varies as shown in FIG. 3. A/D represents an A/D (analog to digital) converter for converting a voltage outputted by the solid-state image sensing device CCD into a digital format. MEM represents a memory, such as a RAM (random access memory) and a PROM (programmable read only memory), for storing a digital value outputted by the A/D converter. To the memory MEM, an output voltage of each pixel obtained when predetermined uniform light is irradiated onto the solid-state image sensing device CCD is supplied to be stored. COR represents a digital correction calculation circuit by which an output voltage of the solid-state image sensing device CCD which voltage is converted by the A/D converter is corrected by use of an output voltage of the solid-state image sensing device CCD which voltage was obtained at the time of uniform light irradiation and has been stored in the memory MEM. An image data corrected is outputted to an apparatus DEV, (e.g. a memory apparatus or a printer).

Figure 6:
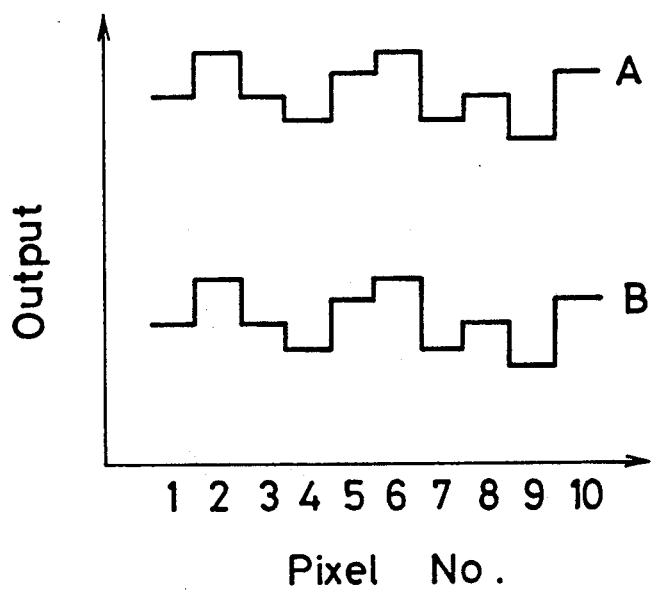
FIG. 6 graphically shows an example of outputs, obtained when uniform light is irradiated, of the solid-state image sensing device having a characteristic that an output voltage thereof natural-logarithmically varies as a light reception amount varies.
Figure 7:
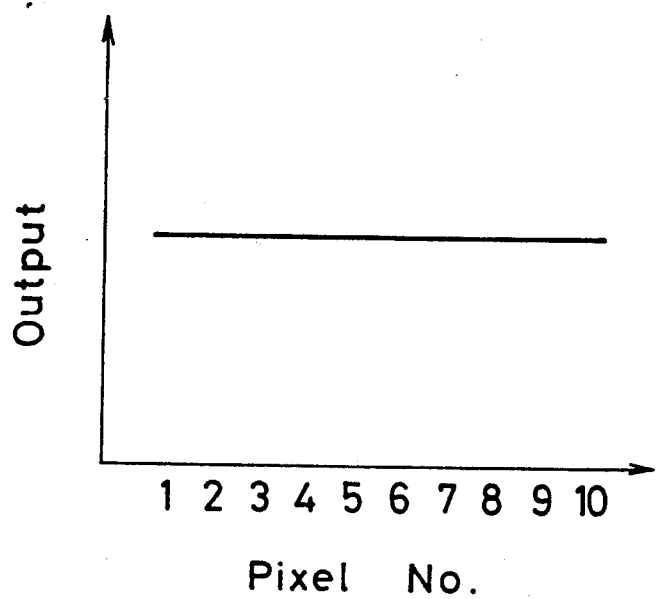
FIG. 7 graphically shows a correction result of the sensitivity inequality of a solid-state image sensing device having a characteristic that an output voltage thereof natural-logarithmically varies as a light reception amount varies.

Hereinafter, a correction example of the sensitivity inequality of the solid-image sensing device having a characteristic that an output voltage thereof natural-logarithmically varies as a light reception amount varies will be described with reference to FIGS. 6 to 10. In FIG. 6, A denotes an example of outputs obtained when bright uniform light (hereinafter referred to as A-level light) is irradiated onto a solid-state image sensing device having a characteristics that an output voltage thereof natural-logarithmically varies as a light reception amount varies. In the figure, B denotes an example of outputs obtained when uniform light (hereinafter referred to as B-level light) less bright than the A-level light is irradiated onto the solid-state image sensing device. If the output in response to the B-level light is subtracted from the output in response to the A-level light, the result is as shown in FIG. 7. Thereby, it is understood that the difference in sensitivity of each pixel can be corrected by the subtraction.

Figure 8:
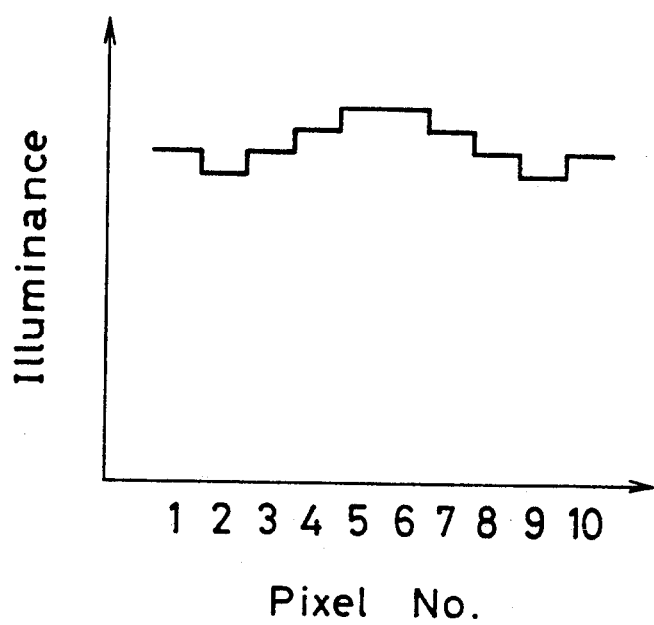
FIG. 8 graphically shows a light distribution provided to a solid-state image sensing device having a characteristic that an output voltage thereof natural-logarithmically varies as a light reception amount varies.
Figure 9:
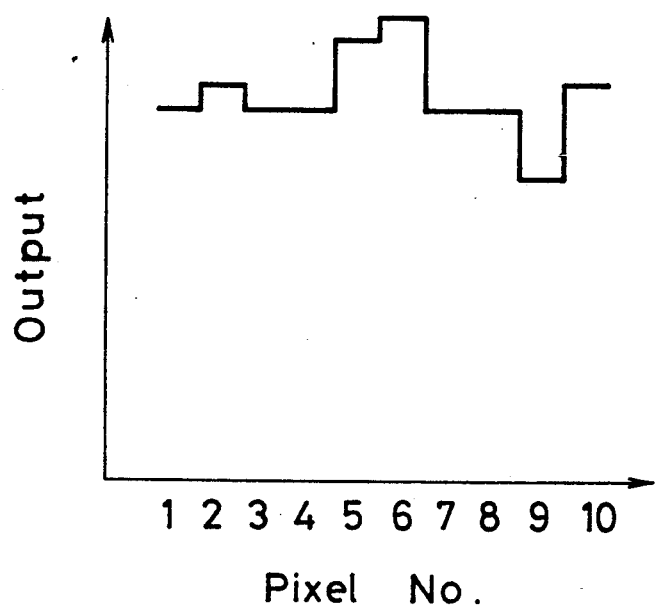
FIG. 9 graphically shows an output of a solid-state image sensing device having a characteristic that an output voltage thereof natural-logarithmically varies as the light reception amount of the light of the distribution of FIG. 8 varies.
Figure 10:
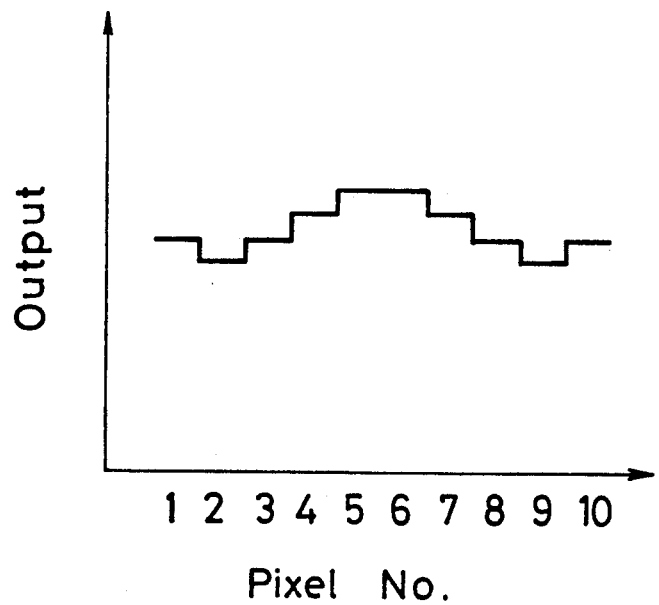
FIG. 10 graphically shows a result of the correction of the sensitivity inequality on the output of FIG. 9.

Subsequently, a case will be described where light of an actual image is sensed. When light of a distribution as shown in FIG. 8 is irradiated onto a solid-state image sensing device having a characteristic that an output voltage thereof natural-logarithmically varies as a light reception amount varies, the output is as shown in FIG. 9 due to the inequality in sensitivity of each pixel. The output is largely different from the actual light distribution. To correct this difference, the output in response to the B-level light shown in FIG. 6 is subtracted from the output shown in FIG. 9. Then, the result is as shown in FIG. 10, where the light distribution of the output coincides with the light distribution provided to the solid-state image sensing device (see FIG. 8). That is, in actually sensing an image, the inequality in sensitivity of each pixel can be corrected only by subtracting from the image sensing data an image sensing data of each pixel which data is obtained when uniform light is irradiated.

Figure 11:
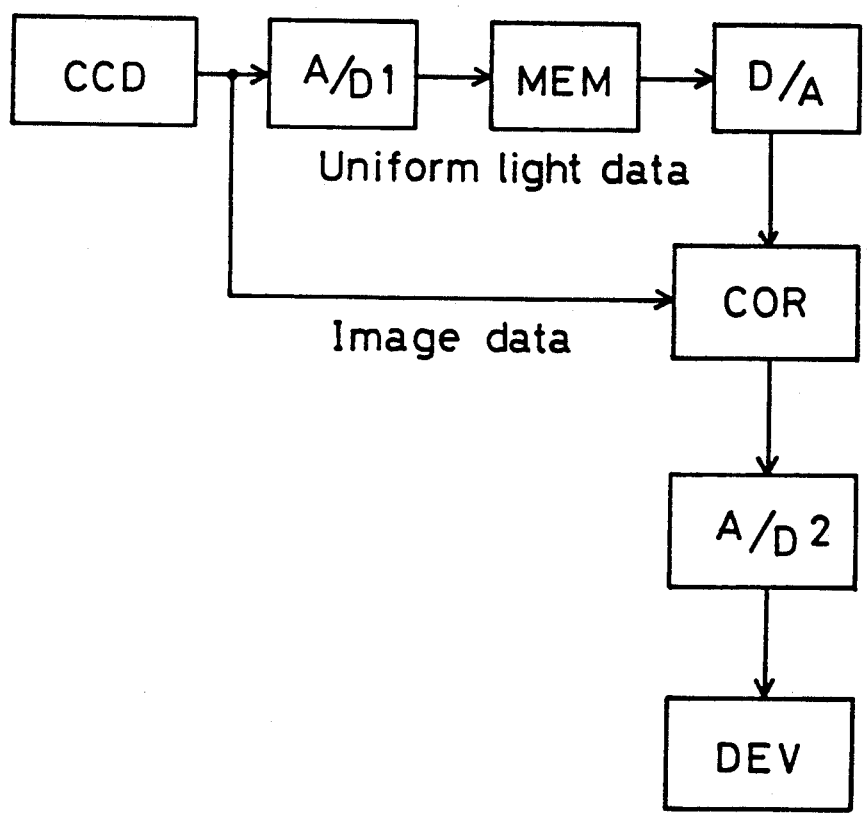
FIG. 11 is a block diagram of a second embodiment of the present invention.

FIG. 11 is a block diagram of a second embodiment of the solid-state image sensing apparatus constructed in accordance with the present invention. CCD represents a solid-state image sensing device where a light reception amount and an output voltage which are natural-logarithmically related to each other. A/D1 and A/D2 represent A/D converters. MEM represents a memory. D/A represents a D/A (digital to analog) converter. COR represents an analog correction calculation circuit. DEV represents an apparatus such as a memory apparatus or a printer.

The output voltage of each pixel of the solid-state image sensing device which voltage is obtained at the time of uniform light irradiation is converted into a digital format by the A/D converter A/D1, and is stored in the memory MEM. In sensing an image, the difference between an image sensing data of each pixel which data is obtained at the time of the uniform light irradiation and is again converted into an analog format by the D/A converter and the actual image sensing data of each pixel is calculated by the analog correction calculation circuit COR to thereby correct the image sensing data. The image sensing data corrected is converted into a digital format by the A/D converter A/D2 and is outputted to the apparatus DEV. With such an arrangement, an analog circuit can be employed as the correction calculation circuit.

As described above, according to the first and second embodiments, in a solid-state image sensing apparatus provided with a solid-state image sensing device having a characteristic that an output voltage thereof natural-logarithmically varies as a light reception amount varies, an inequality in sensitivity of each pixel can be corrected by subtracting from an image sensing data of an object an image sensing data of each pixel which data is obtained when uniform light is irradiated. Moreover, since only addition and subtraction are required, the calculation for correction can quickly be performed.

Before describing a third embodiment of the present invention, the principle will be described of a logarithmic compression conversion of a solid-state image sensing apparatus having a photoelectric conversion characteristic of natural logarithm type which apparatus is the subject of the present invention.

In a MOS (metal oxide semiconductor) transistor, a weak current called a sub-threshold current flows when a gate voltage is lower than a threshold voltage. This is because the surface area of silicon arranged just below a gate oxide film is brought into a weak inversion condition. The sub-threshold current has generally been considered one of the undesirable characteristics of the MOS transistor. In a solid-state image sensing apparatus of the present invention, however, a photoelectric conversion characteristic is controlled by use of the sub-threshold current.

The sub-threshold current is expressed as follows (see R. M. Swanson and J. D. Meindl, "Ion-implanted complementary MOS transistors in low-voltage circuits," IEEE Journal of Solid-State Circuits, vol. SC-7, No. 2, pp. 146-153, Apr. 1972):

when $VG-VS \leq VT+n(kT/q)$, a drain current ID of an n-channel MOS transistor is $$ID=(Z/L)\mu n Co(1/m)(nkT/q)^2$$
$$\exp[(q/nkT)(VG-VS-VT-nkT/q)]\times\{$$
$$1-\exp[(-mq/nkT)(VD-VS)]\} \quad (16)$$

where:
VG is a gate voltage;
VD is a drain voltage;
VS is a source voltage;
VT is a threshold voltage;
Z is a transistor channel width;
L is a transistor channel length;
$\mu n$ is an electron mobility;
q is an electron charge;
k is a Boltzman's constant;
T is an absolute temperature; and
Co is a gate insulation film capacitance.
Moreover, $$m=(Co+Cd)/Co$$

$$n=(Co+Cd+Cfs)/Co$$

$$Cfs=qNfs$$

where Cd is a depletion layer capacitance and Nfs is a surface state density.

When Nfs=0, m=n. In this case, if $VD-VS>>kT/q$, from the expression (16), the following expressions (17) and (18) are obtained:

$$ID=ID0 \exp[(q/nkT)(VG-VS-VT)] \quad (17)$$

$$ID0=(Z/L)\mu n Co(1/n)(nkT/q)^2 \exp[-1] \quad (18)$$

The expression (17) indicates that the drain current ID is an exponential function of a gate-source voltage when $VG-VS \leq VT+n(kT/q)$ and $VD-VS>>kT/q$.

According to the present invention, the above-mentioned weak current characteristic of the MOS transistor is positively utilized as subsequently shown.

Figure 12:
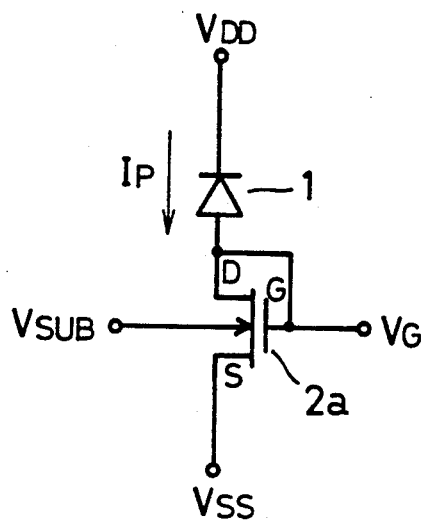
FIG. 12 shows an arrangement of a pixel in a solid-state image sensing apparatus according to the present invention.

FIG. 12 shows an arrangement of a pixel in a solid-state image sensing apparatus according to the present invention.

In the figure, a pn-junction photodiode 1 constitutes a photosensitive portion. An anode of the photodiode 1 is connected to a drain D and a gate G of a MOS transistor 2a. Moreover, a DC (direct current) voltage VDD is applied to a cathode of the photodiode 1, a DC voltage VSS is applied to a surface S of the MOS transistor 2a, and a DC voltage SUB is applied to a back gate (substrate) of the MOS transistor 2a. In the figure, $VDD>VSS \geq VSUB$ is fulfilled. Moreover, a reverse bias is applied to the photodiode 1. The reverse bias is also applied to the source S, the drain D and the substrate of the MOS transistor 2a.

When light is incident onto the photosensitive portion, a photocurrent Ip which is in proportion to light intensity flows from the cathode to the anode of the photodiode 1.

Since VD=VG, $$(kT/q) << VG - VSS \leq VT + nkT/q \quad (19).$$

Hence, from the expression (17), the current ID flowing through the MOS transistor 2a is $$ID = ID0 \exp[(q/nkT)(VG - VSS - VT)] \quad (20).$$

Since ID=Ip in a steady state, $$Ip = ID0 \exp[(q/nkT)(VG - VSS - VT)] \quad (21).$$

From the expression (21), $$VG = VSS + VT + (nkT/q) \ln (Ip/ID0) \quad (22).$$

Hence, it is understood that if the expression (19) is fulfilled, the photocurrent is logarithmically converted into the gate voltage VG.

The expression (19) can be fulfilled by voltage adjustment as subsequently shown.

The expression (17) indicates that the drain current ID is a function of the threshold voltage VT. On the other hand, the threshold voltage VT is expressed as $$VT = \Phi_{MS} - qNfs/Co + 2\Phi_f + \frac{\sqrt{2\epsilon_{si}\epsilon_o qNB(|2\Phi_f| + VS - VSUB)}}{Co}, \quad (23)$$

where:

ΦMS is a difference between a work function of a gate electrode and that of a silicon substrate;
Φf is a fermi level of the silicon substrate;
εsi is a silicon dielectric constant;
εo is a vacuum dielectric constant; and
NB is an impurity density in the silicon substrate.

The expression (23) shows that the threshold voltage VT changes according to VSS−VSUB (=VS−VSUB). Since the drain current ID changes according to the change of the threshold voltage VT, the expression (19) is fulfilled by properly setting the voltage VSUB to an appropriate value.

Hereinafter, an example will be described.
In the example, the following constants are used:

$NB = 1 \times 10^{15}/cm^3$ $Z/L = 1$ $\mu n = 1000 \ cm^2/V \cdot sec$ $T = 300K$ $Co = 3.5 \times 10^{-8} F/cm^2$ When the gate electrode is made of aluminum, ΦMS=−0.9 V at the above substrate density.

Moreover, if conditions Cd=Cfs=0 and Nfs=0 are set for simplicity, m=n=1.

In this case, the drain current ID0 is $$ID0 = 1000 \times 3.5 \times 10^{-8} \times (0.026)^2 \times 0.368$$
$$= 8.70 \times 10^{-9}$$

On the other hand, concerning the threshold voltage VT, when VS−VSUB=0 V, $$VT(0) = -0.9 + 0.58 + \frac{\sqrt{2 \times 11.7 \times 8.85 \times 10^{-14} \times 1.6 \times 10^{-19} \times 10^{15} \times 0.58}}{3.5 \times 10^{-8}} = 0.08,$$

and when VS−VSUB=5 V, $$VT(5) = 0.91$$

When the luminance on the surface of a photosensitive element is within a range between 0.11x and $10^{-4}$1x and the area of the photodiode is 100 μm², the photocurrent Ip is approximately $10^{-4}$ to $10^{-9}$ A.

From the above photocurrent and the expression (22), VG−VSS is within a range between VT-0.06 to VT-0.36. That is, when VS−VSUB=0 V, VG−VSS=0.02 to −0.28
when VS−VSUB=5 V, VG−VSS=0.85 to 0.55

This shows that, although the expression (19) is not fulfilled when VS−VSUB=0 V, the expression (19) is fulfilled when VS−VSUB=5 V. Thus, the photocurrent can be converted into a logarithmically compressed voltage by setting the voltage VSUB to an appropriate value.

Figure 13:
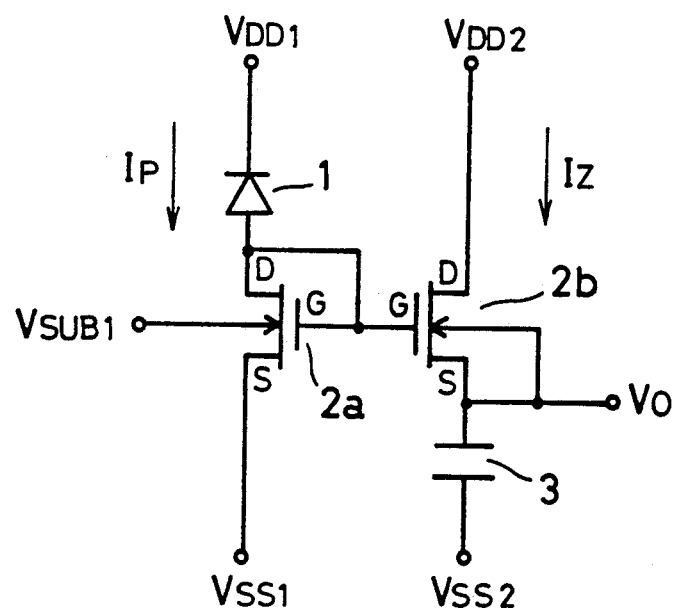
FIG. 13 shows an arrangement of a pixel in another solid-state image sensing apparatus according to the present invention.

FIG. 13 shows an arrangement of a pixel of a solid-state image sensing apparatus where an integrating circuit is added to the arrangement of FIG. 12.

In the figure, the pn-conjunction photodiode 1 constitutes a photosensitive portion, and the anode thereof is connected to a drain and a gate of a first n-channel MOS transistor 2a and to a gate of a second n-channel MOS transistor 2b. Moreover, the DV voltage VDD is applied to the cathode of the photodiode 1, a DC voltage VSS1 is applied to the source of the first MOS transistor 2a, and a DC voltage VDD2 is applied to a drain of the second MOS transistor 2b. Further, the source of the second MOS transistor 2b is connected via a capacitor 3 having a capacitance C to a direct current voltage VSS2. On the other hand, a direct current voltage VSUB1 is applied to the substrate of the first MOS transistor 2a. When the second MOS transistor 2b is formed on the same chip or in the same well where the first MOS transistor 2a is formed, the direct current voltage VSUB1 is applied to the substrate of the second MOS transistor 2b. When the second MOS transistor 2b is formed on another chip or a well thereof different from that where the first MOS transistor 2b is formed, a DC voltage VSUB2 is applied to the substrate of the second MOS transistor 2b or the substrate is connected to the source of the second MOS transistor 2b.

In this FIG. 13, as subsequently shown, an integration value of the photocurrent Ip is logarithmically compressed into a voltage VO obtained at a junction of the source of the second MOS transistor 2b and the capacitor 3.

In the following description, it is assumed that the first MOS transistor 2a and the second MOS transistor 2b have the same characteristic. Moreover, the substrate of the second MOS transistor 2b is connected to the source of the second MOS transistor 2b.

When VG is a gate voltage of the first and second MOS transistors 2a and 2b, from the expression (22), $$VG = VSS1 + VT + (nkT/q) \ln (Ip/ID0) \qquad (24)$$

A current Iz flowing through the second MOS transistor $2b$ is $$Iz = ID0 \exp[(q/nkT)(VG - V0 - VT)] \qquad (25)$$

Moreover, the following relationship holds:

$$Iz = C(dV0/dt) \qquad (26)$$

From the expressions (24), (25) and (26), the following expression is obtained:

$$C(dV0/dt) = Ip \exp[(q/nkT)(VSS1 - V0)]$$

That is, $$\exp[(q/nkT)(V0 - VSS1)]dV0 = (Ip/C)dt \qquad (27)$$

When $t=0$, if the expression (27) is integrated on condition that $V0 = V01$, the following expression (28) is obtained:

$$V0 = VSS1 + (nkT/q)\ln[(q/nkTC)\int Ipdt + \exp\{(q/nkT)(V01 - VSS1)\}] \qquad (28)$$

The expression (28) shows that the sum of an integration value of the photocurrent Ip and a constant value determined by $V01 - VSS1$ is logarithmically converted into the voltage V0. Since the constant value decreases as $V01 - VSS1$ decreases, the accuracy in logarithmic conversion increases by setting the initial value V01 of the voltage V0 to a low value compared to a source voltage of the first MOS transistor $2a$.

An output voltage obtained by the above-described circuit can be inputted as a charge to the CCD, for example, by a voltage balancing method (see Carlo H. Sequin and Michael F. Tompsett, Bell Telephone Laboratory, "Charge Transfer Devices", New Jersey: Murray Hill, page 43).

In this case, from the expression (28), a charge Qo to be transmitted to the CCD is $$Qo = CV0 = CVSS1 + (nkT/q) \ln [(q/nkTC)\int Ipdt + \exp\{(q/nkT)(V01 - VSS1)\}] \qquad (29)$$

Further, from the expression (29), an output voltage V0′ obtained from an outputting circuit of the CCD is $$V0' = Qo/C0 = (C/C0)VSS1 + (nkTC/qC0) \ln [(q/nkTC)\int Ipdt + \exp\{(q/nkT)(V01 - VSS1)\}] \qquad (30)$$

Since it is possible to fulfill $V01 - VSS1 \leq 0$ by selecting a drive condition of the first and second MOS transistors $2a$ and $2b$ and an input portion of the CCD, the term $\exp\{(q/nkT)(V01 - VSS1)\}$ can be set to a value too small to be ignored compared to the term $(q/nkTC) \int Ipdt$. Moreover, the expression (30) can be simplified as $$V0' \approx (C/C0)VSS1 + (nkTC/qC0) \ln \{(q/nkTC)\int Ipdt\} \qquad (31)$$

Further, the expression (31) is re-written as $$V0' \approx (C/C0)VSS1 + (nkTC/qC0) \ln (q/nkTC) + (nkTC/qC0) \ln \int Ipdt\} \qquad (32)$$

In the expression (32), C is a charge storage capacitance provided to every pixel as shown in FIG. 13, and C0 is an outputting circuit capacitance of the CCD for converting a charge into a voltage. Moreover, n is a value determined by a composition and arrangement of the MOS transistor of each pixel. Hence, only C, n and Ip differ depending each pixel, and C0, k, T, q, V and SS1 are common to all the pixels.

From the above, it is understood that the terms (C/C0) VSS1 and (nkTC/qC0) ln (q/nkTC) are automatically determined if n and C are determined. When it is written as $(C/C0)VSS1 + (nkTC/qC0) \ln (q/nkTC) = A$ for simplicity, the expression (32) is re-written as $$V0' \approx A + (nkTC/qC0) \ln \int Ipdt \qquad (33)$$

Further, since the term nkTC/qC0 is automatically determined by the values of n and C, when $nkTC/qC0 = B$, the expression (33) is re-written as $$V0' \approx A + B \ln \int Ipdt \qquad (34)$$

Now, the sensitivity of the photodiode will be considered.

When a photodiode sensitivity of a pixel is $\alpha$ and a light amount is L, $$Ip = \alpha L \qquad (35)$$

Substitution of the expression (35) for the expression (34) gives $$V0' \approx A + B \ln \int \alpha L dt \qquad (36)$$

Further, since the sensitivity $\alpha$ never varies with the lapse of time, when $L \neq 0$, the expression (36) is re-written as $$V0' \approx A + B \ln \alpha + B \ln \int L dt \qquad (37)$$

Hereinafter, an actual method will be described of correcting the difference among pixels.

Although an output voltage is generally expressed by the expression (37), since A, B and $\alpha$ are constants different depending on each pixel, an output voltage Vi of an ith pixel is expressed as $$Vi = Ai + Bi \ln \alpha i + Bi \ln \int Li dt \qquad (38)$$

where $i = 1, 2, 3, \ldots$

Figure 14:
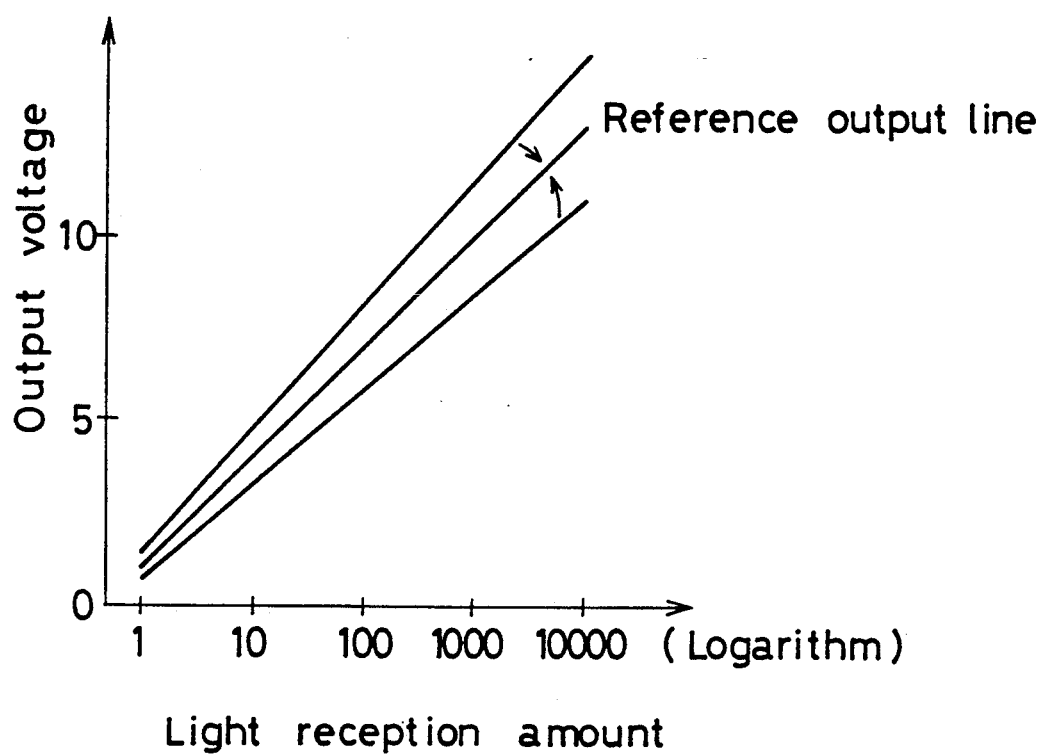
FIG. 14 is a view for explaining correction of a difference among outputs in the solid-state image sensing apparatus.

That is, as shown in FIG. 14, when a relationship between a light reception amount and an output voltage is graphically shown, an inclination and an offset obtained at a light reception amount differ depending on each pixel since Ai, Bi and $\alpha i$ differ depending on each pixel. The third embodiment of the present invention is intended to make a correction so that the inclination and offset coincide with a reference output line.

Subsequently, a specific method of the correction will be described.

An output voltage Vi(L) obtained when uniform light L is provided is expressed as $$Vi(L) = Ai + Bi \ln \alpha i + Bi \ln \int Li dt \qquad (39)$$

Moreover, an output voltage Vi(L′) obtained when another uniform light L′ is provided is $$Vi(L')=Ai+Bi \ln \alpha i+Bi \ln \int L' i dt \qquad (40)$$

where $i=1, 2, 3, \ldots$

If the expression (40) is subtracted from the expression (39) with respect to each pixel, $$\begin{aligned} Vi(L) - Vi(L') &= Bi \ln \int L i dt - Bi \ln \int L' i dt \\ &= Bi \ln(\int L i dt / \int L' i dt) \end{aligned} \qquad (41)$$

where $i=1, 2, 3, \ldots$

If a similar calculation is performed assuming that a reference pixel i is 0, $$V0(L)-V0(L')=B0 \ln (\int L i dt / \int L' i dt) \qquad (42)$$

Division of each member of the expression (42) by the corresponding member of the expression (41) gives $$\begin{aligned} \{V0(L) - V0(L')\}/\{Vi(L) - Vi(L')\} &= \frac{\{B0\ln(\int L i dt/\int L' i dt)\}}{\{Bi\ln(\int L i dt/\int L' i dt)\}} \\ &= B0/Bi \end{aligned} \qquad (43)$$

When a picture signal Li is provided, an output voltage thereof is $$Vi(Li)=Ai+Bi \ln \alpha i+Bi \ln \int L i dt \qquad (44)$$

Subtraction of the expression (40) from the expression (44) gives $$Vi(Li) - Vi(L')=Bi \ln (\int L i dt/\int L' i dt) \qquad (45)$$

Multiplication of each member of the expression (45) by the corresponding member of the expression (43) gives $$\{V0(L) - V0(L')\}/\{Vi(L) - Vi(L')\} \times \qquad (46)$$

$$\begin{aligned} \{Vi(Li) - Vi(L')\} &= \{B0\ln(\int L i dt/\int L' i dt)\} \\ &= \{B0 \ln \int L i dt - B0 \ln \int L' i dt \} \end{aligned}$$

In the right member of the expression (46), there are no coefficients which cause the difference among pixels. Hence, since the output difference among pixels is caused only by the light amount Li, the output difference due to the difference in the sensitivity of the photodiode, charge storage capacitance and the MOS transistor can completely be removed.

In the Japanese laid-open Patent Application No. S60-241370, the correction is made by a method similar to that used for a solid-state image sensing device where a light reception amount and an output voltage have linear characteristics. Specifically, bright uniform light L is irradiated, and sampling of an output is made. Then, sampling is made under a condition where $L'=0$. Based on the two data, the difference among pixels is corrected by use of the above-mentioned method. However, if the correction with respect to a solid-state image sensing device having a logarithmically compressing circuit is made by this method, it is impossible to correct the difference among pixels for the following reason:

When the uniform light L is irradiated, the voltage Vi(L) is obtained similarly to the expression (39), $$Vi(L)=Ai+Bi \ln i+Bi \ln \int L dt \qquad (47)$$

Moreover, when $L'=0$, from the expression (30), $$Vi(L')=(Ci/Co)V01 \qquad (48)$$

where $L'=0$ and Ci is a charge storage capacitance of an ith pixel.

If a calculation similar to that of the present invention is performed from the expressions (47) and (48), $$Vi(L)-Vi(L')=Ai+Bi \ln \alpha i+Bi \int L dt-(Ci/C0)V01 \qquad (49)$$

Since the term (Ci/C0)V01 is also a constant different depending on each pixel, when $(Ci/C0)V01=Di$, the expression (49) can be re-written as $$Vi(L) - Vi(L')=Ai+Bi \ln \alpha i-Di+Bi \int L dt \qquad (50)$$

Since not only the terms Ai and Bi ln $\alpha$i which cause the difference among pixels cannot be removed but also a new term $-Di$ which causes the difference is added, it is impossible to correct the difference.

Figure 15:
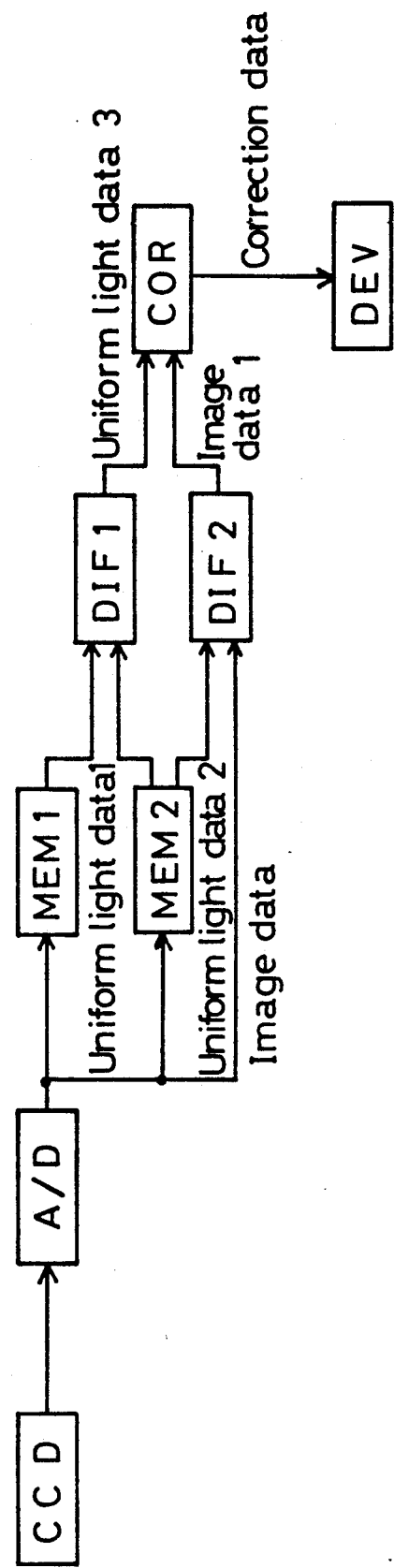
FIG. 15 is a block circuit diagram showing a general arrangement of a third embodiment of the present invention.

FIG. 15 is a block diagram of the third embodiment of a solid-state image sensing apparatus embodying the present invention.

CCD is a solid-state image sensing device having a characteristic that an output voltage thereof naturallogarithmically varies as a light reception amount varies. A/D is an A/D converter for converting a voltage outputted by the solid-state image sensing device CCD into a digital value. MEM1 and MEM2 are memories, which consists of a RAM or PROM, for storing the digital value obtained through the conversion by the A/D converter. DIF1 and DIF2 are digital subtracting circuits. COR is a digital correcting circuit. DEV is an apparatus such as a memory apparatus and a printer.

An output voltage of each pixel of the solid-state image sensing device CCD which voltage is obtained when uniform light of an illuminance L is irradiated is converted into a uniform light data 1 which is of digital value by the A/D converter A/D and is stored in the memory MEM1. Then, uniform light of an illuminance L' is irradiated. An output voltage of each pixel of the CCD which voltage is obtained at that time is stored in the MEM2 as a uniform light data 2. The storage of the data in the memories MEM1 and MEM2 is performed only once. Therefore, the data can be stored during the manufacturing process. In that case, however, a memory such as an EPROM (erasable programmable read only memory) or an E²PROM (electrically erasable programmable read only memory) is required where no backup power source is required.

In sensing an image, an output voltage of each pixel of the CCD is converted into an image data which is of digital value by the A/D converter. When this happens, the uniform light data 1 and the uniform light data 2 corresponding to each pixel of the CCD are read out from the memories MEM1 and MEM2. A difference between them is calculated by the subtracting circuit DIF1 and is outputted as a uniform light data 3. In addition thereto, a difference between an image data of each pixel and the uniform light data 2 is calculated by the digital subtracting circuit DIF2 and is outputted as an image data 1. The uniform light data 3 and the image data 1 are transmitted to the digital correcting circuit COR, where the ratio between them is calculated and they are multiplied by a reference voltage (that is, $V0(L)-V0(L')$). A correction data with respect to each pixel is obtained as described above, and is transmitted to the apparatus DEV.

In the above description, it is assumed that the first and the second MOS transistors 2a and 2b have the same characteristic. A case where the transistors have different characteristics will hereinafter be described.

In this case, since the values of the threshold voltage VT and n are different, when an output voltage of the first MOS transistor 2a is VT1×n1 and an output voltage of the second MOS transistor 2b is VT2×n2, the expressions (24) and (25) are re-written as $$VG = VSS1 + VT + (n1kT/q) \ln (Ip/ID0) \quad (51)$$

$$Iz = ID0 \exp[(q/n2kT)(VG - V0 - VT2)] \quad (52)$$

From the above expressions (51) and (52) and the expression (26), the voltage V0 is $$V0 = VSS1 + VT1 - VT2 + (n2kT/q) \ln [(q/n2kTCID0^{\{(n1/n2)-1\}}) \int Ip^{n1/n2} dt + \exp \{(q/n2kT)(Vo1 - VSS1 - VT1 + VT2)\}] \quad (53)$$

Therefore, the output voltage V0′ obtained from the outputting circuit of the CCD is $$V0' = (C/C0)(VSS1 + VT1 - VT2) + (n2kTC/qC0) \ln [(q/n2kTCID0^{\{(n1/n2)-1\}}) \int Ip^{n1/n2} dt + \exp \{(q/n2kT)(V01 - VSS1 - VT1 + VT2)\}] \quad (54)$$

Since V01−VSS1−VT1+VT2<<0 can be fulfilled if a drive condition is selected, the expression (54) can be simplified as $$V0' \approx (C/C0)(VSS1 + VT1 - VT2) + (n2kTC/qC0) \ln \{(q/n2kTCID0^{\{(n1/n2)-1\}}) \int Ip^{n1/n2} dt\} \quad (55)$$

Further re-writing of the expression (55) gives $$V0' = (C/C0)(VSS1 + VT1 - VT2) + \{(n2kTC/qC0) \ln (q/n2kTC)\} - \{(n2kTC/qC0) \ln ID0^{\{(n1/n2)-1\}}\} + \{(n2kTC/qC0) \ln \int Ip^{n1/n2} dt\} \quad (56)$$

Since the first to third terms of the right member of the expression (56) are constants determined depending on each pixel, the expression (56) can further be re-written as $$V0' = Ai + Bi \ln \int Ip^{n1i/n2i} dt \quad (57)$$

Therefore, substitution of the expression (35) gives $$V0' \approx Ai + Bi \ln \int (\alpha L)^{n1i/n2i} dt \quad (58)$$

Further, since the sensitivity α never varies with the lapse of time, the following expression (59) is obtained:

$$V0' = Ai + Bi \ln \alpha^{n1i/n2i} + Bi \ln \int L^{n1i/n2i} dt \quad (59)$$

From this, the output voltage Vi of an ith pixel is $$Vi = Ai + Bi \ln \alpha_i^{n1i/n2i} + Bi \ln \int L^{n1i/n2i} dt \quad (60)$$

where i=1, 2, 3, ...

Subsequently, a specific correcting method will be described.

An output voltage obtained when the uniform light L is irradiated is $$Vi(L) = Ai + Bi \ln \alpha_i^{n1i/n2i} + Bi \ln \int L^{n1i/n2i} dt \quad (61)$$

When the light L′ is irradiated, an output voltage is $$Vi(L') = Ai + Bi \ln \alpha_i^{n1i/n2i} + Bi \ln \int L'^{n1i/n2i} dt \quad (62)$$

Subtraction of the expression (62) from the expression (61) gives $$Vi(L) - Vi(L') = Bi \ln (\int L^{n1i/n2i} dt)/(\int L'^{n1i/n2i} dt) \quad (63)$$

In a similar calculation is performed assuming that a reference i is 0, $$V0(L) - V0(L') = B0 \ln (\int L^{n10/n20} dt)/(\int L'^{n10/n20} dt) \quad (64)$$

Division of each member of the expression (64) by the corresponding member of the expression (63) gives $$\{V0(L) - V0(L')\}/\{Vi(L) - Vi(L')\} = B0 \ln \{(\int L^{n10/n20} dt)/(\int L'^{n10/n20} dt)\}/\{Bi \ln (\int L^{n1i/n2i} dt)/(\int L'^{n1i/n2i} dt)\} \quad (65)$$

When n10/n20 = n1i/n2i, that is, when the ratio between n1 and n2 is equal with respect to all the pixels, the expression (65) is re-written as $$\{V0(L) - V0(L')\}/\{Vi(L) - Vi(L')\} = B0/Bi \quad (66)$$

which is equal to the expression (43). Therefore, since a result the same as that obtained when the first and second MOS transistors 2a and 2b have the same characteristic is obtained, the correction can completely be made by a similar method.

As described above, according to the third embodiment, coefficients relating to the difference in sensitivity of the photodiode are removed by calculation performed by the first subtracting means, and coefficients relating to the difference in sensitivity are similarly removed by the second subtracting means. Although there remain coefficients which cause an inclination in output of the first and second subtracting means, the coefficients which cause an inclination are removed by obtaining a ratio by the dividing means. Thus, all of the coefficients which cause the difference among pixels are removed in the end. As a result, an excellent image signal is obtained where there is no difference among outputs of pixels.

In addition to the above-mentioned advantages, the third embodiment is advantageous in arranging the circuit. Concerning the correction of the difference in the sensitivity of each pixel, the Japanese laid-open Patent Application S58-177071 discloses an arrangement where multiplication and division are performed. A circuit for performing multiplication and division, however, generally requires a complicated arrangement. Moreover, if the multiplication and division are performed in a software manner, the calculation speed is low. On the contrary, according to the third embodiment, since the difference in sensitivity is corrected by subtraction, a circuit for the subtraction requires no complicated arrangement. Moreover, if the calculation is performed in a software manner, the processing speed is high.

Figure 16:
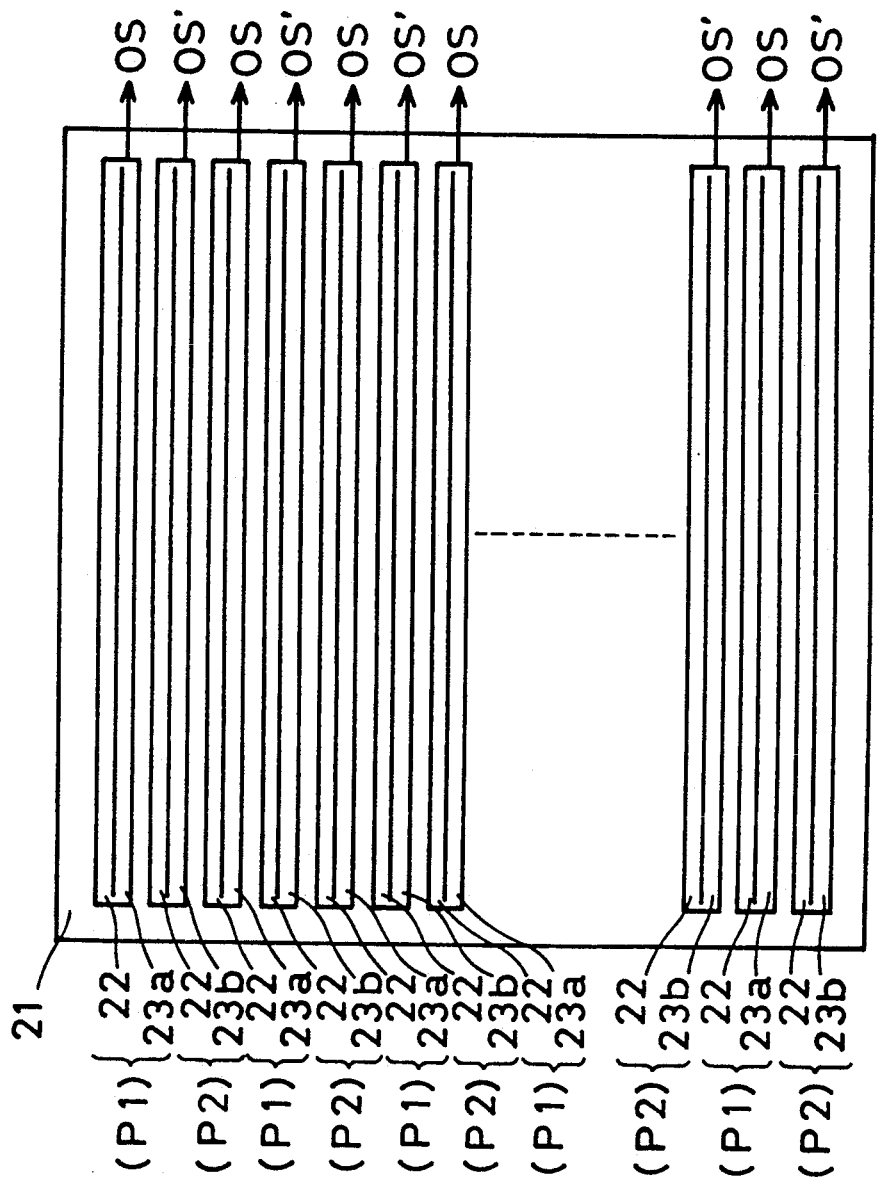
FIG. 16 is a view showing a layout of a fourth embodiment of the present invention.

In a fourth embodiment of the present invention shown in FIG. 16, pairs (first pairs (P1)) consisting of a first photoelectrically converting portion 22 provided with a logarithmically compressing circuit and a transfer register 23a which transfers a photoelectric charge toward the right direction of FIG. 16 are repeatedly arranged. Between the first pairs (P1), second pairs (P2) are arranged consisting of a second photoelectrically converting portion 22' not provided with a logarithmically compressing circuit and a transfer register 23b which transfers an optical charge obtained by the second photoelectrically converting portion 22' toward the right of the figure. Outputs of the first and second pairs are taken out from the right ends of the transfer registers 23 and 23' as signals OS and OS', respectively. OS is a signal having a wide dynamic range, while OS' is a signal having a narrow dynamic range.

Figure 17:
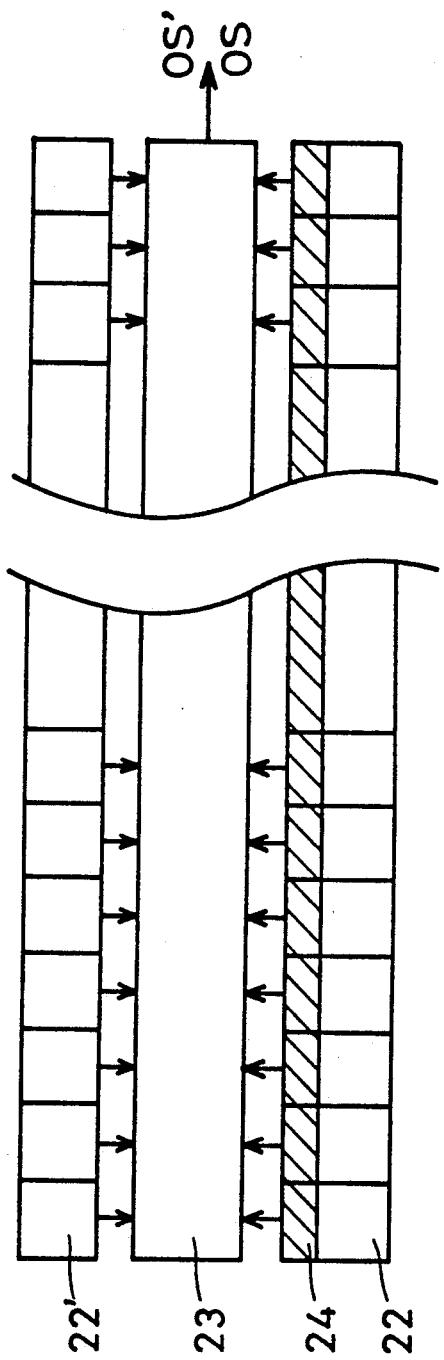
FIG. 17 is a view showing a layout of a fifth embodiment of the present invention.

In a fifth embodiment of the present invention shown in FIG. 17, a first photoelectrically converting portion 22 and a second photoelectrically converting portion 22' are arranged on both sides of one transfer register 23. Optical charges thereof are directed by way of the transfer register 23 to an output terminal (on the right end). In the figure, the numeral 24 represents a logarithmically compressing circuit. In this embodiment, one transfer register 23 is used by both of a signal OS having a wide dynamic range and a signal OS' having a narrow dynamic range.

Figure 18:
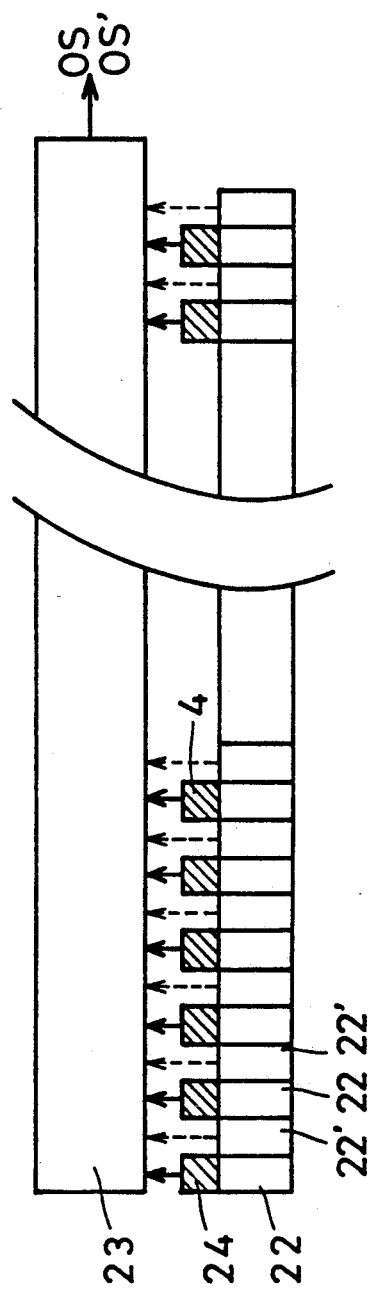
FIG. 18 is a view showing a layout of a sixth embodiment of the present invention.

In a sixth embodiment of the present invention shown in FIG. 18, first photoelectrically converting portions 22 connected to a logarithmically compressing circuit 24 and second photoelectrically converting portions 22' not connected to the logarithmically compressing circuit 24 are alternately arranged on a line. Optical charges thereof are provided to a transfer register 23.

Figure 19:
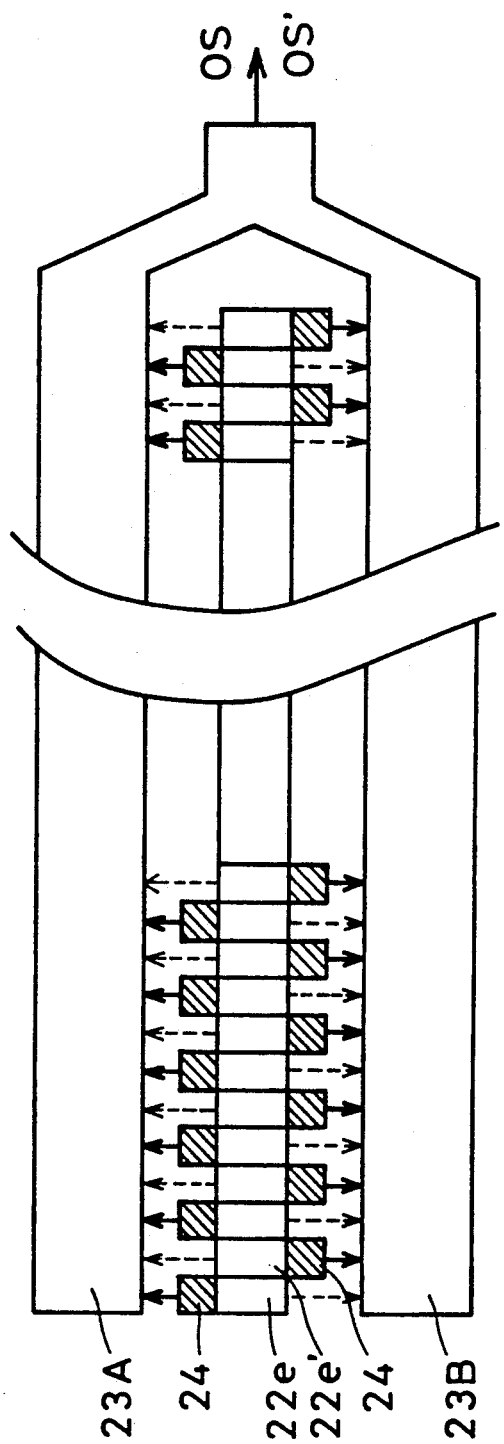
FIG. 19 is a view showing a layout of a seventh embodiment of the present invention.

In a seventh embodiment of the present invention shown in FIG. 19, a photoelectrically converting portion is arranged between a first and second transfer registers 23A and 23B connected to each other at an output side in parallel with the first and second transfer registers 23A and 23B. Elements 22e of the photoelectrically converting portion are connected to the first transfer register 23A through a logarithmically compressing circuit 24, and are connected to the second transfer register 23B not through the logarithmically compressing circuit 24. The other elements 22e' are connected to the second transfer register 23B through the logarithmically compressing circuit 24, and are connected to the first transfer register 23A not through the logarithmically compressing circuit 24. In the embodiment of FIG. 19, the density of an optical charge outputted is high compared to that of the embodiments of FIGS. 17 and 18.

Figure 20:
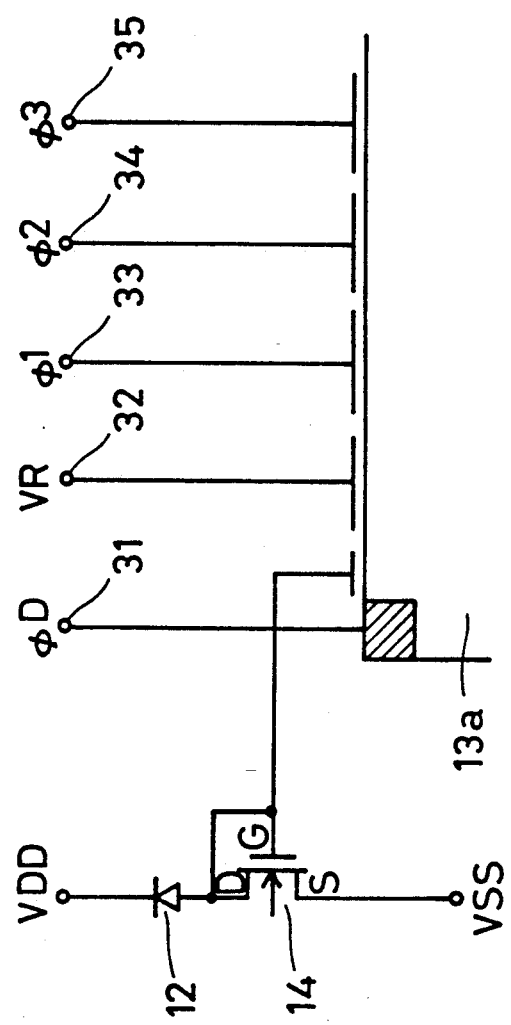
FIG. 20 is a circuit diagram of a portion, of the fourth embodiment of FIG. 16, where the dynamic range is wide.

FIG. 20 is a circuit diagram showing one of the elements of the first photoelectrically converting portion 22 having a logarithmically compressing circuit and a charge coupled device 13a which is used as the transfer register 23a which transfers an optical charge thereof which element and the charge coupled device 13a are employed for the fourth embodiment of FIG. 16. In the figure, the numeral 12 represents a photodiode for photoelectric conversion, and the numeral 14 represents an N-channel MOS transistor for logarithmic compression. To the charge coupled device 13a, a pulse φD for injecting the optical charge provided by way of the logarithmically compressing circuit is provided through a terminal 31. Moreover, a direct current voltage VR relating to a potential for an accumulation of the injected optical charge at an input portion of the charge coupled device 13a is provided through a terminal 32, and three-phase pulses φ1, φ2 and φ3 are provided through terminals 33, 34 and 35, respectively.

Figure 21:
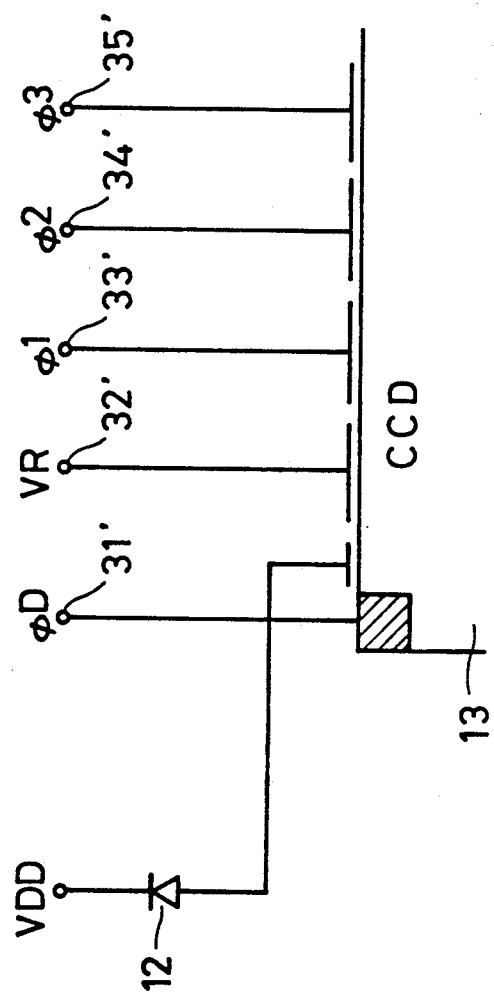
FIG. 21 is a circuit diagram of a portion, of the fourth embodiment of FIG. 16, where the dynamic range is narrow.

FIG. 21 shows a photodiode 12 which is used as the second photoelectrically converting portion 22' not having the logarithmically compressing circuit and a charge coupled device 13b which is used as the transfer register 23b. The arrangement of FIG. 21 is the same as that of FIG. 20 except that no MOS transistor is provided and that the anode of the photodiode 12 is directly connected to the charge coupled device 13b.

In the embodiment of FIG. 16, the signal OS having a wide dynamic range and passing through the logarithmically compressing circuit and the signal OS' having a narrow dynamic range and not passing through the logarithmically compressing circuit are selectively outputted. The selection between the signals OS and OS' can be made by selecting a value of the voltage VR provided to the terminal 32 of FIG. 20 and to the terminal 32' of FIG. 21. That is, in these circuits, the charge coupled device where the voltage VR is set to an ground potential outputs no optical charge. Therefore, in a case where the solid-image sensing device is used for an object having a narrow dynamic range such as prints, the ground potential is provided to the terminal 32 of FIG. 20 and a positive voltage, to the terminal 32' of FIG. 21. On the other hand, in a case where the solid-state image sensing apparatus is used for an object having a wide dynamic range such as scenery, the ground potential is provided to the terminal 32' of FIG. 21 and the positive voltage, to the terminal 32 of FIG. 20.

While a dynamic range of the solid-state image sensing apparatus is changed over by the applied voltage VR in FIGS. 20 and 21, it may be changed over by another appropriate method. Concerning the embodiments of FIGS. 17 to 19, a case where only the signal OS having a wide dynamic range is obtained and a case where only the signal OS' having a narrow dynamic range is obtained can be realized by an appropriate selecting mechanism including the method of FIGS. 20 and 21.

As described above, according to the present invention, since the image sensing device can be used both under a condition where the dynamic range is wide and under a condition where the dynamic range is narrow, an image of good quality is always obtained by properly selecting the condition of the dynamic range depending on an object.

With respect to the solid-state image sensing apparatus of FIG. 13, the following expression is held:

$$V0 = VSS1 + (nkT/q) \ln [(q/nkTC) \int Ipdt + \exp\{(q/nkT) \times (V0I - VSS1)\}] \quad (67)$$

Since a condition can be selected so that $V0I - VSS1 << 0$, $\exp\{(q/nkT)(V0I - VSS1)\}$ can be ignored. Therefore, the expression (67) can be written as $$V0 \approx VSS1 + (nkT/q) \ln \{(q/nkTC) \times \int Ip \times dt\} \quad (68)$$

Since VSS1, n, k, T, q and C are constants, the expression (68) is re-written as $$\begin{aligned} V0 &= A' + B\ln(q/nkTC) + B\ln \int Ip \times dt \\ &= A + B\ln \int Ip \times dt \end{aligned} \quad (69)$$

where A and B are constants.

When an output obtained at an illuminance L is V and a spectral transmission factor of each pixel is α, the following expressions hold with respect to R, G and B:

$$V_{Ri}(L) = A + B \ln \int \{\int \alpha_{Ri}(\lambda)L(\lambda)d\lambda\}dt \quad (70)$$

$$V_{Gi}(L) = A + B \ln \int \{\int \alpha_{Gi}(\lambda)L(\lambda)d\lambda\}dt \quad (71)$$

$$V_{Bk}(L) = A + B \ln \int \{\int \alpha_{Bk}(\lambda)L(\lambda)d\lambda\}dt \quad (72)$$

When an output obtained at an incidence of the white light W is V (W), $$V_{Ri}(W) = A + B \ln \int \{\int \alpha_{Ri}(\lambda)L_w(\lambda)d\lambda\}dt \quad (73)$$

$$V_{Gi}(W) = A + B \ln \int \{\int \alpha_{Gi}(\lambda)L_w(\lambda)d\lambda\}dt \quad (74)$$

$$V_{Bk}(W) = A + B \ln \int \{\int \alpha_{Bk}(\lambda)L_w(\lambda)d\lambda\}dt \quad (75)$$

When subtractions of (70)−(73), (71)−(74) and (72)−(75) are performed and a predetermined value Vo is added thereto, the following expressions hold:

$$V'_{Ri}(L) = V_{Ri}(L) - V_{Ri}(W) = B \ln \int \{\int \alpha_{Ri}(\lambda)L(\lambda)d\lambda\}dt - B \ln \int \{\int \alpha_{Ri}(\lambda)L_w(\lambda)d\lambda\}dt + Vo \quad (76)$$

$$V'_{Gi}(L) = V_{Gi}(L) - V_{Gi}(W) = B \ln \int \{\int \alpha_{Gi}(\lambda)L(\lambda)d\lambda\}dt - B \ln \int \{\int \alpha_{Gi}(\lambda)L_w(\lambda)d\lambda\}dt + Vo \quad (77)$$

$$V'_{Bk}(L) = V_{Bk}(L) - V_{Bk}(W) = B \ln \int \{\int \alpha_{Bk}(\lambda)L(\lambda)d\lambda\}dt - B \ln \int \{\int \alpha_{Bk}(\lambda)L_w(\lambda)d\lambda\}dt + Vo \quad (78)$$

When a white light W' having the same color temperature (that is, spectral characteristic) and a different illuminance is incident, $$\begin{aligned} V'_{Ri}(W') &= V_{Ri}(W') - V_{Ri}(W) \\ &= B\ln\int\{\int \alpha_{Ri}(\lambda) \times l \times L_w(\lambda)d\lambda\}dt - \\ &\quad B\ln\int\{\int \alpha_{Ri}(\lambda)L_w(\lambda)d\lambda\}dt + Vo \\ &= B\ln l + Vo \end{aligned}$$

$$V'_{Gi}(W') = V_{Gi}(W') - V_{Gi}(W) = B\ln l + Vo$$
$$V'_{Bk}(W') = V_{Bk}(W') - V_{Bk}(W) = B\ln l + Vo$$

Since $$V'_{Ri}(W') = V'_{Gi}(W') = V'_{Bk}(W')$$

from the above expressions, it is understood that a white balance is obtained.

Moreover, in a case where a color temperature of a light source changes, a white balance is similarly easily obtained by obtaining a difference between an image sensing data of light corresponding to white light and an image sensing data of a subject. Subsequently, a case will be described where a color temperature of a light source changes. In this case, the spectral characteristic $L_W(\lambda)$ of white light is different.

From the expressions (76), (77) and (78), the following expressions are obtained:

$$V_{Ri}'(W') = B \ln \int \{\int \alpha_{Ri}(\lambda)L_w'(\lambda)d\lambda\}dt - B \ln \int \{\int \alpha_{Ri}(\lambda)L_w(\lambda)d\lambda\}dt + Vo$$

$$V_{Gi}'(W') = B \ln \int \{\int \alpha_{Gi}(\lambda)L_w'(\lambda)d\lambda\}dt - B \ln \int \{\int \alpha_{Gi}(\lambda)L_w(\lambda)d\lambda\}dt + Vo$$

$$V_{Bk}'(W') = B \ln \int \{\int \alpha_{Bk}(\lambda)L_w'(\lambda)d\lambda\}dt - B \ln \int \{\int \alpha_{Bk}(\lambda)L_w(\lambda)d\lambda\}dt + Vo$$

where LW' is a spectral characteristic of the white light W'. Since $L_w'(\lambda) \neq L_w(\lambda)$, $$V_{Ri}(W') \neq V_{Gi}(W') \neq V_{Bk}(W').$$

Therefore, no white balance can be obtained.

However, if V' (L)−V(W') in the expressions (76), (77) and (78), that is, an output V(W') obtained when the white light W' is irradiated is subtracted from an output of each pixel, $$V_{Ri}''(W') = V_{Ri}(W') - V_{Ri}(W') + Vo$$

$$V_{Gi}''(W') = V_{Gi}(W') - V_{Gi}(W') + Vo$$

$$V_{Bk}''(W') = V_{Bk}(W') - V_{Bk}(W') + Vo$$

and $$V_{Ri}''(W') = V_{Gi}''(W') = V_{Bk}''(W').$$

As a result, a white balance is obtained. Thus, a white balance is obtained only by performing a subtraction again.

Figure 22:
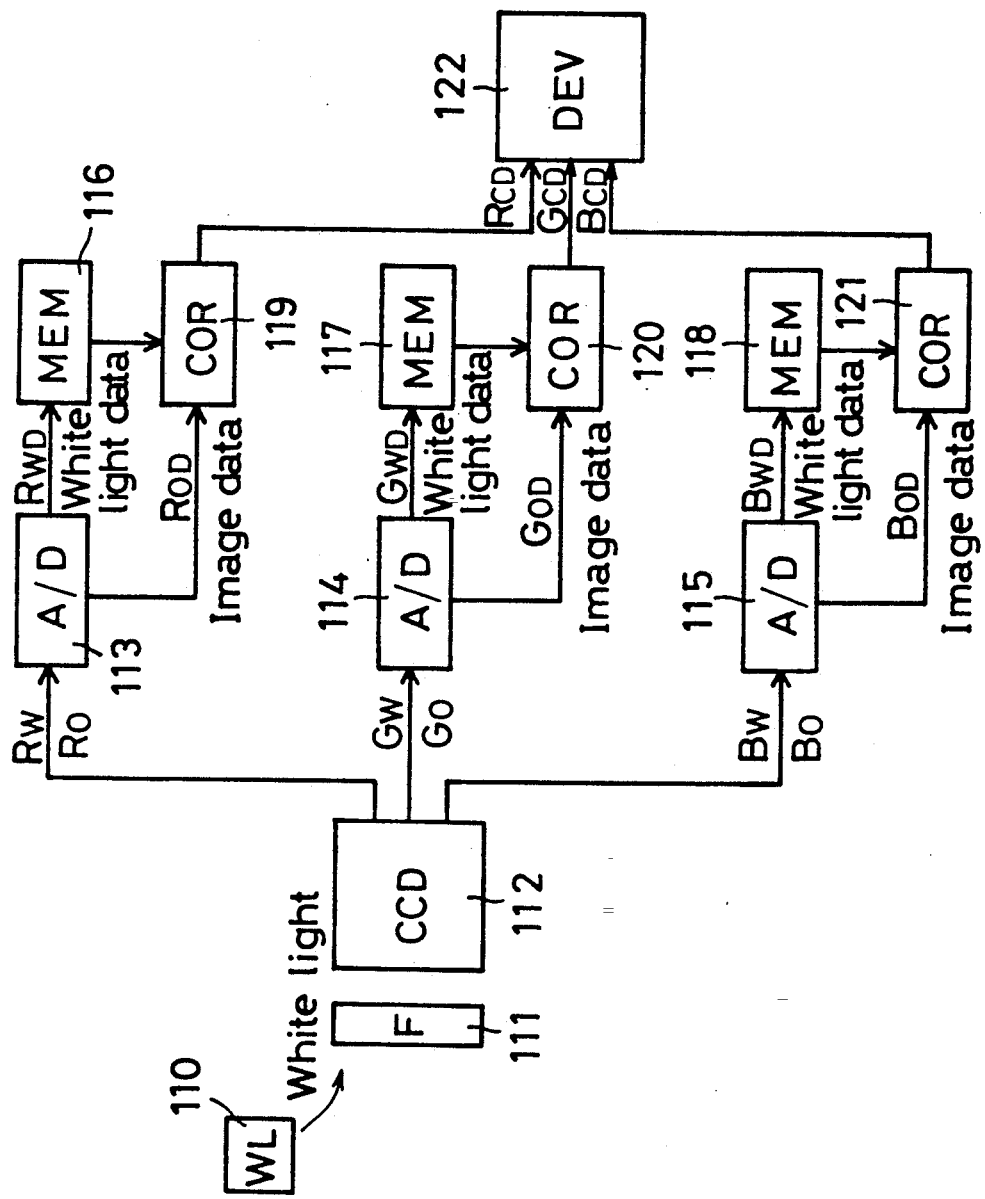
FIG. 22 is a block diagram showing an arrangement of a eighth embodiment of the present invention.

FIG. 22 is a block diagram of a eighth embodiment of a solid-state image sensing apparatus constructed in accordance with the present invention.

A CCD 112 is a solid-state image sensing device having a characteristic that an output voltage thereof natural-logarithmically varies as a light reception amount varies. The numeral 111 represents filter means for color-separating incident light into R, G and B (or C (cyan), M (magenta) and Y (yellow)). The numeral 110 represents white light irradiating means (such as a white light source and a white calibrating plate) for projecting white light to the CCD 112 through the filter 111.

In a video camera employing the solid-state image sensing apparatus of the eighth embodiment, white light is obtained by covering a taking lens with the white calibrating plate. The numerals 113, 114 and 115 represent A/D converters for converting a voltage outputted by the CCD 112 into a digital format. The numerals 116, 117 and 118 represent memories such as a RAM and a PROM for storing digital values obtained through the conversion by the A/D converters 113, 114 and 115. The numerals 119, 120 and 121 represent digital correction calculating circuits. The numeral 122 is an apparatus (such as a memory apparatus and a printer) for receiving a corrected data outputted by the digital correction calculating circuits 119, 120 and 121.

Subsequently, an operation of the solid-state image sensing apparatus will be described. When white light is projected through the filter 111 to the CCD 112 by the white light irradiating means 110, the CCD 112 generates outputs RW, GW and BW corresponding to R, G and B, respectively. After the outputs RW, GW and BW are converted into digital values by the A/D converters 113, 114 and 115, respectively, digital data RWD, GWD and BWD thereof are stored to the memories 116, 117 and 118 corresponding thereto, respectively.

Then, an actual subject is photographed, the CCD 112 generates outputs R0, G0 and B0 corresponding to R, G and B, respectively. The outputs R0, G0 and B0 are converted into digital values by the A/D converters 113, 114 and 115, respectively. Digital data R0D, G0D and B0D thereof are transmitted to the digital correction calculating circuits 119, 120 and 121, respectively. The digital correction calculating circuits 119, 120 and 121 read out the white light data RWD, GWD and BWD from the memories 116, 117 and 118, respectively. Then, by obtaining the differences from the image data R0D, G0D and B0D, the circuits 119, 120 and 121 form image data RCD, GCD and BCD where white balance correction has been made, and output them to the outputting apparatus 122. By obtaining the difference between the white light data and the image data as described above, an image data where white balance correction is made is obtained.

Figure 23:
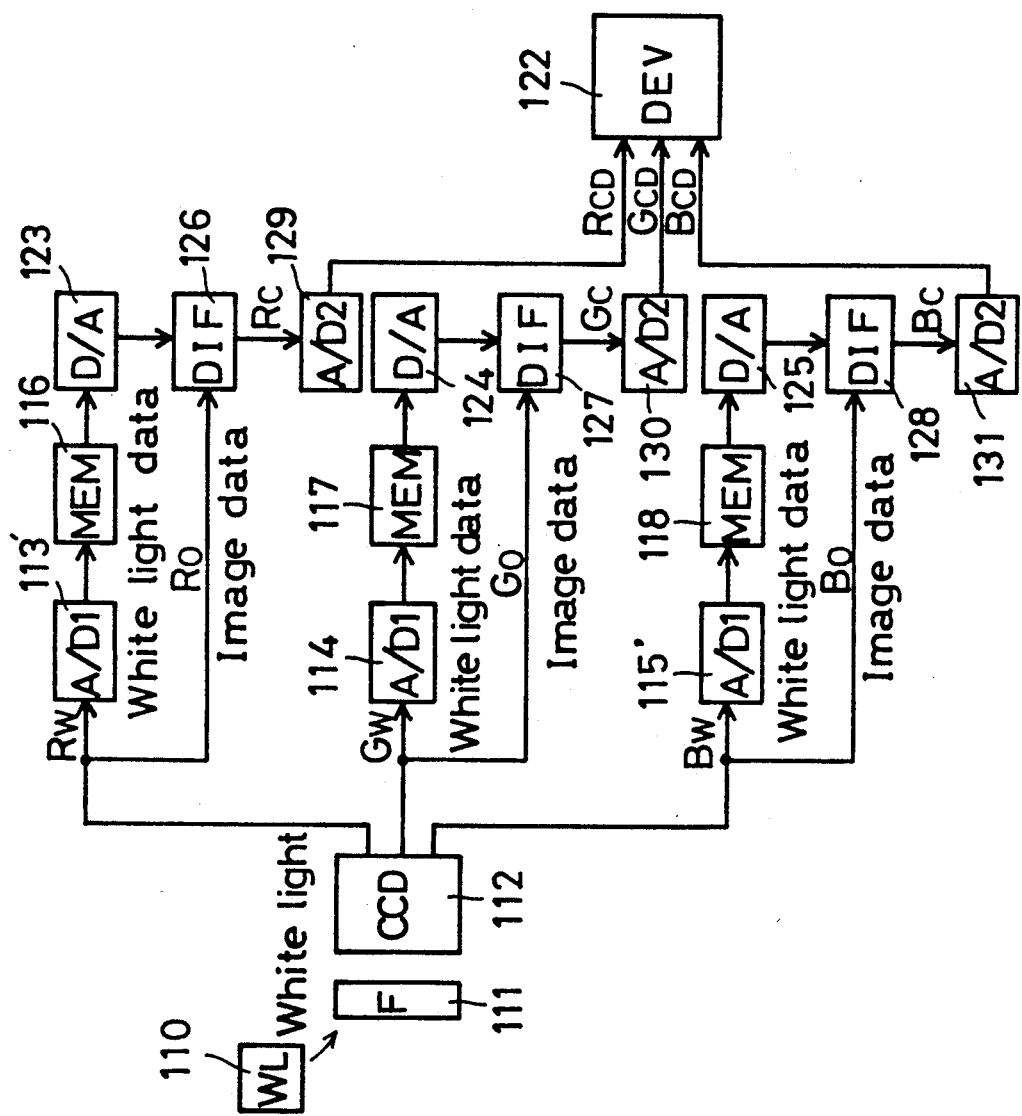
FIG. 23 is a block diagram of a ninth embodiment of the present invention.

FIG. 23 is a block diagram of a ninth embodiment of a solid-state image sensing apparatus embodying the present invention. In the ninth embodiment, the white balance correction is made when the signals are in an analog format. In FIG. 23, portions the same as those of FIG. 22 are provided with the same reference designations, and a description thereof will be omitted.

In the figure, the numerals 113', 114' and 115' represent first A/D converters, while the numerals 129, 130 and 131 represent second A/D converters. The numerals 123, 124 and 125 represent D/A converters, and the numerals 126, 127 and 128 represent analog differential amplifying circuits.

The output voltages RW, GW and BW with respect to the R, G and B of each pixel of the CCD 112 which voltages are obtained when white light is irradiated are converted into digital values by the first A/D converters 113', 114' and 115', and are stored in the memories 116, 117 and 118. In sensing an image, the difference between the actual image sensing data R0, G0 and B0 and the image sensing data RW, GW and BW obtained at the time of white light irradiation and converted again into analog values by the D/A converters 123, 124 and 125 is calculated by the analog differential amplifying circuits 126, 127 and 128. Thereby, the white balance correction of the image sensing data is made. Analog image sensing data RC, GC and BC which have been corrected as described above are converted into digital values by the second A/D converters 129, 130 and 131, and are supplied to the outputting apparatus 122. With the arrangement of FIG. 13, the white balance correction can be made when the signals are in an analog format.

As described above, according to the eighth and ninth embodiments of the present invention, only by obtaining the difference between image sensing data with respect to white light and image sensing data with respect to a subject, a solid-state color image sensing apparatus by which white balance is easily obtained can be realized. That is, with the eighth and ninth embodiments, since the photoelectric conversion characteristic of the photoelectrically converting portion is of natural logarithm, a photoelectric conversion output Vo is expressed as $$Vo = A + B \ln \int \{\int \alpha(\lambda) L(\lambda) d\lambda\} dt$$

where A and B are constants, $\alpha$ is a spectral transmission factor of a pixel, L is an illuminance and $\lambda$ is a wavelength of light. For example, with respect to outputs of three primary colors of red (R), green (G) and blue (B), if the outputs obtained at the time of white light incidence is subtracted from the outputs obtained at the time of subject light irradiation, the outputs of the three primary colors equal one another. Thereby, it is understood that white balance has been obtained. Moreover, a circuit for white balance correction can readily be arranged. Further, a calculation required for the white balance correction can simply and rapidly be performed.

Obviously, many modifications and variations of the present invention are possible in light of the above teachings. It is therefore to be understood that within the scope of the appended claims, the invention may be practiced other than as specifically described.

What is claimed is:

1. A solid-state image sensing apparatus comprising:
    a solid-state image sensing device having a plurality of pixels and a characteristic that an output voltage thereof natural-logarithmically varies in accordance with a light reception amount;
    storing means for storing an image sensing output signal obtained with respect to each pixel when uniform light is irradiated to the solid-state image sensing device; and
    calculating means for calculating a difference between an image sensing output signal obtained with respect to each pixel in actual sensing and a stored image sensing output signal with respect to a pixel corresponding thereto which signal is stored in said storing means, to form an image signal.

2. A solid-state image sensing apparatus according to claim 1, wherein said solid-state image sensing device generates each output voltage corresponding to each of three primary colors of light for sensing a color image, and said storing means stores an image sensing output voltage obtained from the solid-state image sensing device with respect to each pixel when a white light is irradiated to the solid-state image sensing device and a white balance of an image signal is realized in a calculation by said calculating means.

3. A solid-state image sensing apparatus comprising:
    a solid-state image sensing device having a plurality of pixels and a characteristic that an output voltage thereof natural-logarithmically varies in accordance with a light reception amount;
    first storing means for storing an image sensing output signal obtained from the solid-state image sensing device with respect to each pixel when a first light is irradiated to the solid-state image sensing device;
    second storing means for storing an image sensing output signal obtained from the solid-state image sensing device with respect to each pixel when a second uniform light of which light amount is different from that of the first uniform light is irradiated to the solid-state image sensing device;
    first calculating means for calculating a difference between the output signals which are stored, respectively, in the first and the second storing means with respect to each pixel;
    second storing means for calculating a difference between an image sensing output signal obtained with respect to each pixel in actual sensing and a stored image sensing output signal with respect to a pixel corresponding thereto which signal is stored in said second storing means; and
    third calculating means for calculating a ratio of the difference calculated by the first calculating means to the difference calculated by the second calculating means to form an image signal.

4. A solid-state image sensing apparatus comprising;
    a solid-state image sensing device having a plurality of pixels and a characteristic that an output voltage thereof natural-logarithmically varies in accordance with light reception amount;
    first calculating means for calculating with each pixel a difference between an image sensing output from the solid-state image sensing device when a first uniform light is irradiated to the solid-state image sensing device and an image sensing output signal from the solid-state image sensing device when a second uniform light of which light amount is different from that of the first light amount is irradiated to the solid-state image sensing device;

second calculating means for calculating a difference between a sensing signal obtained with respect to each pixel in actual sensing and a stored image sensing output signal with respect to a pixel corresponding thereto obtained when the second uniform light is irradiated to the solid-state image sensing device; and third calculating means for calculating a ratio of the difference calculated by the first calculating means to the difference calculated by the second calculating means to form an image signal.

5. A solid-state image sensing apparatus comprising:

a solid-state image sensing device having a plurality of pixels and a characteristic that an output voltage thereof natural-logarithmically varies in accordance with a light reception amount, the solid-state image sensing device is directed to generate voltage corresponding to respective three primary colors of light for sensing a color image;

storing means for storing an image sensing output signal obtained from the solid-state image sensing device with respect to each pixel when white light is irradiated to the solid-state image sensing device; and calculating means for calculating a difference between an image sensing signal obtained with respect to each pixel in actual sensing and a stored image sensing output signal with respect to a pixel corresponding thereto which signal is stored in the storing means to realize a white balance of an image signal.

* * * * *